(12) United States Patent  
Wiklem et al.

(10) Patent No.: US 9,597,586 B1  
(45) Date of Patent: Mar. 21, 2017

(54) PROVIDING VIDEO GAMING ACTION VIA COMMUNICATIONS IN A SOCIAL NETWORK

(71) Applicant: CP Studios LLC, Salt Lake City, UT (US)

(72) Inventors: Brian Joseph Wiklem, Salt Lake City, UT (US); Carrie Ann Cowan, Salt Lake City, UT (US)

(73) Assignee: CP Studios Inc., Salt Lake City ( * ) Notice: Subject to any disclaimer, the term of this patent is extended or adjusted under 35 U.S.C. 154(b) by 385 days.

(21) Appl. No.: 13/889,284

(22) Filed: May 7, 2013

Related U.S. Application Data

(60) Provisional application No. 61/643,352, filed on May 7, 2012.

(51) Int. Cl.
    *A63F 13/00* (2014.01)
    *A63F 13/30* (2014.01)

(52) U.S. Cl.
    CPC .................. *A63F 13/12* (2013.01)

(58) Field of Classification Search
    CPC ............................ A63F 13/12; G07F 17/3225
    USPC ......................................... 705/7, 14; 463/42
    See application file for complete search history.

(56) References Cited

U.S. PATENT DOCUMENTS

| | | | |
|---|---|---|---|
| 6,386,980 B1 | 5/2002 | Nishino et al. | |
| 6,478,679 B1 | 11/2002 | Himoto et al. | |
| 6,699,125 B2 | 3/2004 | Kirmse et al. | |
| 7,628,688 B2 | 12/2009 | Hinami | |
| 7,955,175 B1 | 6/2011 | Holloway et al. | |
| 8,200,020 B1 | 6/2012 | Geiss et al. | |
| 8,287,341 B1 | 10/2012 | Reynolds et al. | |
| 2003/0008710 A1 | 1/2003 | Yamaoka et al. | |
| 2003/0038805 A1 | 2/2003 | Wong et al. | |
| 2003/0220143 A1 | 11/2003 | Shteyn et al. | |
| 2004/0266529 A1 | 12/2004 | Chatani | |
| 2005/0049022 A1 | 3/2005 | Mullen | |
| 2007/0087797 A1 | 4/2007 | Van Luchene | |
| 2008/0004117 A1 | 1/2008 | Stamper et al. | |

(Continued)

OTHER PUBLICATIONS

Clash of Clans Strategy Guide—Tapscape www.tapscape.com/clash-of-clans-strategy-guide/, downloaded Apr. 13, 2016 (9 pages).

(Continued)

*Primary Examiner* — David L Lewis  
*Assistant Examiner* — Eric M Thomas  
(74) *Attorney, Agent, or Firm* — Patent Law Works LLP

(57) ABSTRACT

The present technology is directed to a flexible gaming architecture associated or linked with social networks. In some implementations, the flexible architecture facilitates play in a virtual gaming environment associated or linked with a social network, based on actions by users within the social network. The architecture facilitates access to video gaming applications either associated with or linked with social networks in various ways, including 1) directly via social networks or sites, for example, accessed via personal computers; 2) via wall posts or via an online social networking service that enables its users to send and read text-based posts; 3) via mobile devices used to access gaming sites associated with or linked to social networks; and 4) via game consoles configured to access gaming sites either associates with or linked to social networks.

18 Claims, 30 Drawing Sheets

(56) References Cited

U.S. PATENT DOCUMENTS

| | | |
|---|---|---|
| 2009/0307226 A1 | 12/2009 | Koster et al. |
| 2010/0062840 A1 | 3/2010 | Herrmann |
| 2010/0160038 A1 | 6/2010 | Youm et al. |
| 2010/0197380 A1 | 8/2010 | Shackleton |
| 2010/0216553 A1 | 8/2010 | Chudley et al. |
| 2010/0228614 A1* | 9/2010 | Zhang ............... G06Q 10/10 705/14.16 |
| 2011/0018868 A1 | 1/2011 | Inoue et al. |
| 2011/0034246 A1 | 2/2011 | Amitzur |
| 2011/0201414 A1 | 8/2011 | Barclay et al. |
| 2011/0320401 A1 | 12/2011 | Mahajan et al. |
| 2012/0072855 A1* | 3/2012 | Baldwin ............. G06Q 10/10 715/752 |
| 2012/0184363 A1 | 7/2012 | Barclay et al. |
| 2012/0220377 A1 | 8/2012 | Cantor |
| 2012/0254764 A1* | 10/2012 | Ayloo et al. ................ 715/738 |
| 2013/0006709 A1* | 1/2013 | Kosta ................ G07F 17/3206 705/7.29 |
| 2013/0035164 A1 | 2/2013 | Osvald et al. |
| 2013/0097517 A1 | 4/2013 | Reiss et al. |
| 2013/0103447 A1 | 4/2013 | Melander et al. |
| 2013/0184064 A1 | 7/2013 | Manning et al. |
| 2013/0196732 A1 | 8/2013 | Oochi et al. |
| 2014/0004951 A1 | 1/2014 | Kern et al. |
| 2014/0038721 A1 | 2/2014 | Archer et al. |

OTHER PUBLICATIONS http://forum.supercell.net, downloaded Apr. 13, 2016 (1 page).
Madden NFL Cooperative Multiplayer Impressions: Ready on Three, Teamwork!, retrieved from http://kotaku.com/5567763/madden-nfl-11-cooperative-multiplayer-impressions-ready-on-three-teamwork on Oct. 10, 2016 (5 pages).

\* cited by examiner

PROVIDING VIDEO GAMING ACTION VIA COMMUNICATIONS IN A SOCIAL NETWORK

CROSS REFERENCE TO RELATED APPLICATIONS

The present application claims the benefit of priority under 35 U.S.C. §119(e) from U.S. Provisional Application No. 61/643,352 entitled "MULTILAYER FRAMEWORK ARCHITECTURE AND USER INTERFACES FOR VIDEO GAMING APPLICATIONS," filed on May 7, 2012, by Brian Joseph Wiklem, Christopher Robert Masterton, and Carrie Ann Cowan. The entire contents of the provisional application are incorporated by reference herein. The present application also incorporates by reference the contents of utility applications entitled "MULTILAYER SYSTEM FRAMEWORK AND ARCHITECTURE WITH VARIABLE GAMING CAPABILITIES, "PROVIDING SYNCHRONIZED AND INTEGRATED VIDEO GAMING," AND "VIDEO GAMING PLATFORM AND USER INTERFACE," all of which are concurrently submitted and also claim priority under 35 U.S.C. §119(e) from U.S. Provisional Application No. 61/643,352.

BACKGROUND

The present disclosure relates to video gaming applications and platforms, including those accessed via online services or communities, for example, social networks, or directly via hosted websites, dedicated either wholly or partially to them. In particular, the present disclosure relates to providing video gaming action or play via communications in a social network.

In recent years, video games have become extremely popular. Video games are used not only for entertainment, but also for instructional purposes. Players typically interact with a gaming application through computer or console peripherals such as keyboard, mouse, joysticks, a wide variety of game pads, and funny controllers such as the NES Zapper®. More recently, nontraditional controller technologies such as dance pads, the Wii-mote® or the Kinect®, offering new types of gaming experiences are beginning to emerge. These technologies are capable of enhancing games to incorporate movement, creating a new experience and attracting new audiences.

With the popularity of social networks reaching epic proportions, social games have also become very popular. Yet, these social games have a rigid and restricted architecture.

With the ongoing trends and exponential growth in video gaming, it would certainly be beneficial to find better architectures for gaming applications associated with social networks that continue to enhance the user experience.

SUMMARY

The present disclosure overcomes the deficiencies and limitations of the prior art by providing a technology with a flexible architecture for video gaming applications in social networks. In some embodiments, the flexible architecture provides a continuous visual experience for players across different platforms (platform agnostic) and engages them at different levels in social games. Each of the players may have a unique and different visual experience, depending upon the gaming platform a player uses. The architecture facilitates access to video gaming applications in various ways, including 1) via social networks or sites, for example, accessed directly via personal computers; 2) via wall posts or via an online social networking service that enables its users to send and read text-based posts; 3) via mobile devices (iOS, Android, or Windows-based smart phones) that may be used to access digital games in association with social networks; and 4) via game consoles (for example, PS3, Xbox 360, or Wii) configured to access games in association with social networks.

Video gaming applications offered or operated in association with social networks may be purchased via platform application stores. These applications are supported by Android (Android is a Linux-based operating system for mobile devices such as smartphones and tablet computers—it is developed by the Open Handset Alliance), iOS (a mobile operating system developed by Apple Inc.) platforms, and phones operating windows. The user interface of an iOS platform is based on the concept of direct manipulation, using multi-touch gestures. Interface control elements consist of sliders, switches, and buttons. The response to user input is immediate and provides a fluid interface.

Video gaming applications in association with social networks may be hosted or accessed via social networks, other third party services or on third party servers, stand-alone platforms, tablets, smartphones or the like. Multiple players (hundreds, thousands, if not millions) may access gaming applications (in association with social networks) via any or all of these ways. In addition, the flexible architecture provides a scalable infrastructure with cross-platform pollination technology (achievements and rewards are transferred between platforms used by particular players) and secure collection of data. Video gaming applications may be based on universal themes that appeal to a broad range of demographics and provides a continuous flow of data analytics. They offer opportunities for configuring advertisements and promotions to accomplish strategic goals.

In some embodiments, the flexible architecture provides multiple levels of play, permitting players to engage in different ways. The different levels of play options include 1) a peer-to-peer competitive challenge level for core players, 2) a casual play option for play with friends with whom a player shares an affinity, for example, in a social network; and a 3) spectator mode that permits non-players in a network to assist friends. Feed-based triggers allow for greater rewards to players and ease of discovering games.

In yet other embodiments, which may include any or all of the aspects described above, the flexible architecture permits mobile play, extending the gaming arena or world to different platforms, so achievements in a particular game (in association with social networks) may be earned and shared more easily across platforms. In addition, a player may earn location-based rewards.

Moreover, the flexible architecture provides a system of rewards at check-in, to coax players by providing greater incentives. The flexible architecture permits concurrent "solo" play by a player or gamer, collaborative and competitive play by multiple players. The flexible architecture has user interfaces that are configured to provide different experiences for different players, including for example, a three-dimensional user experience. In some embodiments, the video gaming applications include story-driven quests and game play, giving players more than just tasks and chores. As one example, an aviation gaming application (operated in association with a social network) may utilize a collection of 250 or more aircrafts and include transactions relating to the aircrafts and their environment, creation of the environment in which the aircrafts operate, etc. In this particular application, players may create and manage their experience (for example, build and manage an aviation empire), enjoy the thrill of history (aviation's past), and travel the globe and fly through an open network of friendly and rival airports.

In yet other embodiments, the system provides a plurality of features for player control of the virtual arena relating to the social network including control of "play" times, "gifts" and "rewards," "collect" and "decorate" features, monitor types of "play" (for example, acceleration progress), generate user content, etc.

In some embodiments, the video gaming applications in association with the social networks may be free, when typically accessed via social-network platforms, in which instances revenue is generated via market place for products used during the game, direct advertising, etc. The flexible architecture permits for easy access through a particular player's social network, allowing other players to discover a particular game and permit conversion as necessary.

In yet other embodiments, linking or connecting gaming platforms creates a more interesting gaming world.

BRIEF DESCRIPTION OF THE DRAWINGS

The present disclosure is illustrated by way of example, and not by way of limitation, in the figures of the accompanying drawings, in which like reference numerals are used to refer to similar elements.

DETAILED DESCRIPTION

Figure 1:
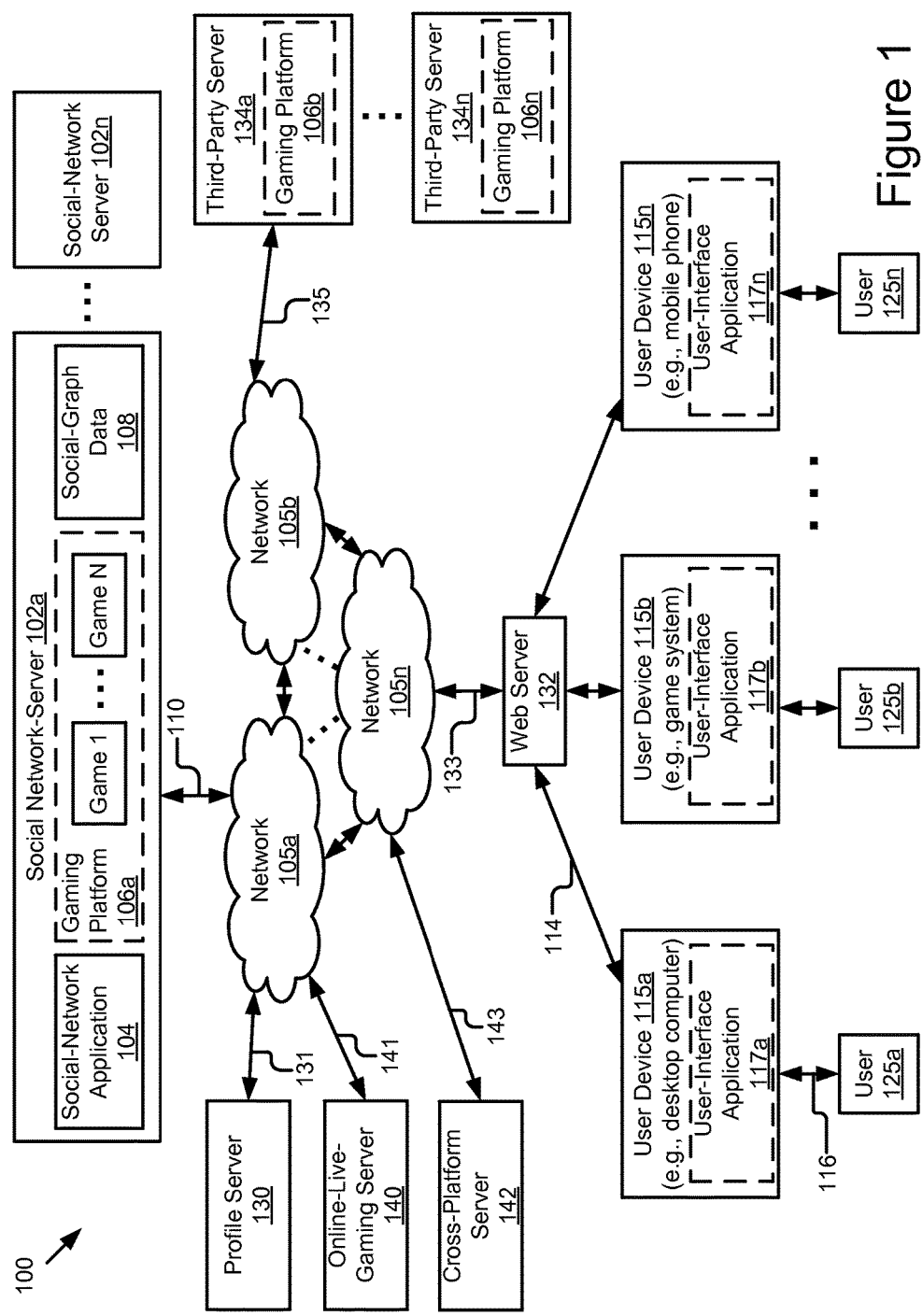
FIG. 1 is a high-level block diagram illustrating some embodiments of a system for providing a video gaming platform, accessed either directly via a social network (hosted on a social network server or a server associated with it), an online live gaming server, or a third party video gaming website (hosted by a third party on its server), which may be associated with social networks.

The present technology is directed to a multilayer or multi-tier, flexible architecture for video gaming applications with variable video gaming capabilities, for play by users (players or gamers), either via social networks, or on third party servers associated with social networks. The specification describes examples of systems and methods for providing this multilayer architecture, video gaming platforms, and user interfaces to facilitate a unique user experience. These video gaming applications may either be hosted by an online community, for example, one or more social networks, or alternatively, by third party servers that are wholly or partially dedicated to gaming applications and associated or linked to social networks.

In some embodiments, the flexible architecture provides a continuous visual experience for players across different platforms (platform agnostic) and engages them at different levels of play. Each of the players may have a unique and different visual experience, depending upon the gaming platform a player uses. This flexible architecture facilitates access to video gaming applications either implemented in social networks or linked to social networks, in various ways, including 1) directly via accessing social networks or sites, for example, accessed via personal computers (desktops or laptops); 2) via wall posts or via an online social networking service that enables its users to send and read text-based posts; 3) via mobile devices (iOS, Android, or Windows-based smart phones) that may be used to access social networks or sites linked to the social networks; and 4) via game consoles (for example, PS3, Xbox 360, or Wii) configured to access social networks or sites linked to social networks.

Video gaming applications linked with social networks may be purchased via platform application stores. These applications are supported by Android (Android is a Linux-based operating system for mobile devices such as smartphones and tablet computers—it is developed by the Open Handset Alliance), iOS (a mobile operating system developed by Apple Inc.) platforms, and phone operating windows. The user interface of iOS is based on the concept of direct manipulation, using multi-touch gestures. Interface control elements consist of sliders, switches, and buttons. The response to user input is immediate and provides a fluid interface.

Video gaming applications may be hosted or accessed via social networks, other third party services or on third party servers linked with the social networks, stand-alone platforms, tablets, smartphones, or the like, configured to access social networks. Multiple players (hundreds, thousands, if not millions) may access one or more gaming applications via any or all of these ways. In addition, the flexible architecture provides a scalable infrastructure with cross-platform pollination technology (achievements and rewards are transferred between platforms for particular players) and secure data collection. Video gaming applications linked with social networks may be based on universal themes that appeal to a broad range of demographics and provides a continuous flow of data analytics. They offer opportunities for configuring advertisements and promotions to accomplish strategic goals.

In yet other embodiments, which may include any or all of the aspects described above, the gaming architecture permits mobile play, extending the gaming arena or world to different platforms and/or networks, so achievements in a particular game may be earned and shared more easily across platforms. In addition, a player may earn location-based rewards.

Moreover, the system architecture provides rewards at check-in, to coax players by providing greater incentives. The architecture permits for concurrent "solo" play by a player or gamer and collaborative and competitive play between multiple players. User interfaces are configured to provide different experiences for different players, including a three-dimensional user experience. In some embodiments, the video gaming applications include story-driven quests and game play, giving players more than just tasks and chores. As one example, an aviation gaming application, may utilize a collection of 250 aircrafts and include transactions relating to the aircrafts and its environment, permitting players to create an environment in which the aircrafts operate, etc. In this particular application, players may create and manage their experience (for example, by creating an aviation empire), enjoy the thrill of history (aviation's past), and travel the globe and fly through an open network of friendly and rival airports.

The system provides features for player control of the virtual arena associated with a social network including control of "play" times, "gifts" and "rewards," "collect" and "decorate," monitor "play" (for example, acceleration progress), generate user content, etc.

The video gaming applications may be free, when directly accessed via social-network platforms, in which instances revenue is generated via market place for products used during the game, direct advertising, etc. The flexible architecture permits for easy access through a particular player's social network, allowing other players to discover a particular game and permit conversion as necessary. Linking or connecting platforms creates a more interesting and viable gaming world.

The architecture accords variable status to players who can opt for different levels of play. A "core" game play status enables players to be leaders and play the entire game. A leader has control of all aspects of a particular gaming application. A "casual" or "follower" game play status enables players to play from a different perspective, providing access to only a portion of the entire game. A "spectator" or "bystander" game play enables players to play from a reactive perspective. Players are accorded this status when they initiate play via a social network wall posting, a response to a social networking service facilitating exchange of text or via any other key word response, which has direct impact on game play. Players with this status can request permission to visit game play arenas of other players. This request may be in response to advertising or promotion displays.

Players (with any status described above) may access game play via mobile devices, at any location, and receive location-based rewards. They may access a virtual game arena, their own or that of other players, via several platforms and take up play where they left off. They may link up friends for collaborative play. Players may also participate in standalone game play, via tablets, mobile devices, console-based game play, target-based game play or the like. In addition, the system permits cross-pollination game play, sending game objects from one game world or arena to another.

In the following description, for purposes of explanation, numerous specific details are indicated in order to provide a thorough understanding of the technology described. This technology may be practiced without these specific details. In the instances illustrated, structures and devices are shown in block diagram form in order to avoid obscuring the technology. For example, the present technology is described with some implementations illustrated below with reference to user interfaces and particular hardware. However, the present technology applies to any type of computing device that can receive data and commands, and any devices providing services. Moreover, the present technology is described below primarily in the context of providing video game architecture; however, the present technology applies to any type of situation and may be used for other applications beyond video games. In particular, this technology may be used in other contexts besides video games.

Reference in the specification to "one embodiment," "an embodiment," or "some embodiments" means simply that one or more particular features, structures, or characteristics described in connection with the one or more embodiments is included in at least one or more embodiments that are described. The appearances of the phrase "in one embodiment or instance" in various places in the specification are not necessarily all referring to the same embodiment or instance.

Some portions of the detailed descriptions that follow are presented in terms of algorithms and symbolic representations of operations on data bits within a computer memory of either one or more computing devices. These algorithmic descriptions and representations are the means used to most effectively convey the substance of the technology. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the following discussion, it should be appreciated that throughout the description, discussions utilizing terms, for example, "processing," "computing," "calculating," "determining," or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present technology also relates to an apparatus for performing the operations described here. This apparatus may be specially constructed for the required purposes, or it may include a general-purpose computer selectively activated or reconfigured by a computer program stored in the computer. For example, a computer program may be stored in a computer-readable storage medium, for example, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

This technology may take the form of an entirely hardware implementation, an entirely software implementation, or an implementation including both hardware and software components. In some instances, this technology is implemented in software, which includes but is not limited to firmware, resident software, microcode, etc.

Furthermore, this technology may take the form of a computer program product accessible from a computer-usable or computer-readable medium providing program code for use by or in connection with a computer or any instruction execution system. For the purposes of this description, a computer-usable or computer-readable medium may be any apparatus that can include, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements may include local memory employed during actual execution of the program code, bulk storage, and cache memories, which provide temporary storage of at least some program code in order to reduce the number of times code may be retrieved from bulk storage during execution.

Input/output or I/O devices (including but not limited to keyboards, displays, pointing devices, etc.) may be coupled to the system either directly or through intervening I/O controllers.

Communication units including network adapters may also be coupled to the systems to enable them to couple to other data processing systems, remote printers, or storage devices, through either intervening private or public networks. Modems, cable modems, and Ethernet cards are just a few examples of the currently available types of network adapters.

Finally, the algorithms and displays presented in this application are not inherently related to any particular computer or other apparatus. Various general-purpose systems may be used with programs in accordance with the teachings here, or it may prove convenient to construct more specialized apparatus to perform the required method steps. The required structure for a variety of these systems is outlined in the description below. In addition, the present technology is not described with reference to any particular programming language. It should be understood that a variety of programming languages may be used to implement the technology as described here.

Architecture Overview

FIG. 1 is a high-level block diagram illustrating some embodiments of systems for providing gaming applications, either directly via social networks, an online live gaming server associated or linked with a social network, or on third party servers associated with or linked with a social network. The system 100 illustrated in FIG. 1 provides gaming platforms 106a or 106b so that participants (players or gamers) may access one or more gaming applications, initiate a play on one device or gaming platform and continue play at another device or gaming platform, making transitions between devices or platforms essentially seamless and enabling a continuous playing experience.

The system 100 includes one or more social network servers 102a through 102n that may be accessed via user devices 115a, 115b through 115n, which are used by users 125a, 125b, through 125n, to connect to any one of the social network servers 102a through 102n. The user devices 115a through 115n may be a desktop computer, a game system or a mobile phone. These entities (user devices 115a-115n and social network servers 102a-102n) are communicatively coupled via one or more networks 105a, 105b, and 105n. Although only three user devices or platforms 115a, 115b through 115n are illustrated, any numbers of user devices or platforms 115n may be used by any number of users (players, gamers, or the like) 125n. Moreover, those skilled in the art should recognize that while the present disclosure is described below primarily in the context of providing gaming applications, the present disclosure may be applicable to other types of applications, for entertainment or otherwise. By way of example, gaming applications may include operations for creating plays, participating in plays, etc.

The user devices 115a through 115n in FIG. 1 are illustrated by way of example. Although FIG. 1 illustrates only three devices, the present disclosure applies to any system architecture having one or more user devices 115a through 115n, therefore, any number of user devices 115n (hundreds, thousands, even millions or more) may be used.

Furthermore, while only three networks 105a, 105b, and 105n are illustrated as coupled to the user devices 115a, 115b through 115n, the social network servers 102a-102n, the profile server 130, the web server 132, the online live gaming server 140, the cross-platform server 142, and one or more third party servers 134a through 134n, in practice, any number of networks 105n may be connected, either directly or indirectly, to these entities. In addition, although only two third party servers 134a through 134n are shown, the system architecture 100 may include one or more third party servers 134n, each with a gaming platform 106b through 106n, operating one or more gaming applications that are similar or different.

In some embodiments, the social network server 102a is coupled to the network 105a, via a signal line 110. The social network server 102a includes a social network application 104, which comprises the software routines and instructions to operate the social network server 102a and its functions and operations. Although only one social network server 102a is described here, persons of ordinary skill in the art should recognize that multiple servers may be present, as illustrated by social network servers 102n, each with functionality similar to social network server 102a or different.

The term "social network" as used here encompasses its plain and ordinary meaning including, but not limited to, any type of social structure where the users are connected by a common feature or link. The common feature includes relationships/connections, e.g., friendship, family, work, a similar interest, etc. The common features are provided by one or more social networking systems, such as those included in the system architecture 100, including explicitly-defined relationships and relationships implied by social connections with other online users, where the relationships form a social graph 108.

The term "social graph" as used here encompasses its plain and ordinary meaning including, but not limited to, a set of online relationships between users (players and non-players), such as provided by one or more social networking systems, operating on social network servers 102a through 102n, including explicitly-defined relationships and relationships implied by social connections with other online users, where the relationships form a social graph. In some examples, the social graph 108 may reflect a mapping of these users and how they are related.

It should be understood that social network server 102a and the social network software/application 104 are representative of a single social network. Each of the plurality of social networks 102a through 102n is coupled to any one of the networks 105a, 105b, and 105n, each having its own server, application, and social graph. For example, a first social network system operated or hosted on a social network server may be directed to business networking, a second directed to or centered on academics, a third directed to local business, a fourth directed to dating or gaming, and yet others directed to other general interests or perhaps a specific focus. Yet, each may provide access to a gaming platform 106a for operating or providing access to video gaming applications.

A profile server 130 is illustrated as a stand-alone server in FIG. 1. In other embodiments of the system architecture 100, all or part of the profile server 130 may be part of the social network server 102a. The profile server 130 is directly connected to the network 105a, via a line 131. The profile server 130 stores profiles for all the users that belong to a social network. A third party server 134a is connected to the network 105b, via a signal line 135. A web server 132 is connected, via a line 133, to the network 105n. The web server 132 delivers access to content, via the internet, for example, by hosted websites or the like. Users may use the web browsers on their electronic devices or gaming platforms to browse for gaming applications and access websites hosting gaming applications.

An online live gaming server 140 is an online multiplayer gaming and digital media delivery service connected to the network 105a through 105n via signal line 141 for providing users (i.e., players) with online gaming capabilities. This allows users to interact (e.g., play games) with multiple players (hundreds, thousands, if not millions) via the online live gaming server 140 (e.g., Xbox Live, Playstation Network, etc.).

A cross-platform server 142 is an online server connected to the network 105a through 105n via signal line 143 that receives information from one or more clients (e.g., mobile device, social network, gaming server, etc.) and translates the data such that it becomes usable by the gaming platform 106a through 106n. The cross-platform server 142 also translates information from the gaming platform 106a through 106n such that it becomes usable by the one or more clients (e.g., mobile device, social network, gaming server, etc.).

The user devices or player gaming platforms 115a through 115n may be a computing device, for example, a laptop computer, a desktop computer, a tablet computer, a mobile telephone (iOS, Android, or windows-based phone, a personal digital assistant (PDA), a mobile email device, a portable game player, a game console (PS3, Xbox 360, Wii or the like) a portable music player, a television with one or more processors embedded in the television or coupled to it, or any other electronic device capable of accessing a network and participating in a gaming application.

The network 105a, 105b, or 105n, is of conventional type, wired or wireless, and may have any number of configurations, such as a star configuration, token ring configuration, or other configurations known to those skilled in the art. Furthermore, the network 105 may comprise a local area network (LAN), a wide area network (WAN, e.g., the Internet), and/or any other interconnected data path across which one or more devices may communicate.

In another embodiment, the network 105a, 105b, or 105n may be a peer-to-peer network. The network 105a, 105b, or 105n may also be coupled to or include portions of one or more telecommunications networks for sending data in a variety of different communication protocols.

In yet another embodiment, the network 105a, 105b, or 105n, includes Bluetooth communication networks or a cellular communications network for sending and receiving data such as via short messaging service (SMS), multimedia messaging service (MMS), hypertext transfer protocol (HTTP), direct data connection, WAP, email, etc.

In some embodiments, the social network server 102a, the profile server 130, the web server 132, online live gaming server 140, cross-platform server 142, and the third party servers 134a through 134n are hardware servers including a processor, memory, and network communication capabilities. One or more of the users (players or gamers) 125a through 125n access any of the social network servers 102a through 102n, or the third party servers 134a through 134n, via browsers in their user devices or gaming platforms and via the web server 132. The user devices 115a through 115n have user interface applications 117a, 117b, through 117n, that manage access by particular players to select gaming applications or their choice.

Figure 2:
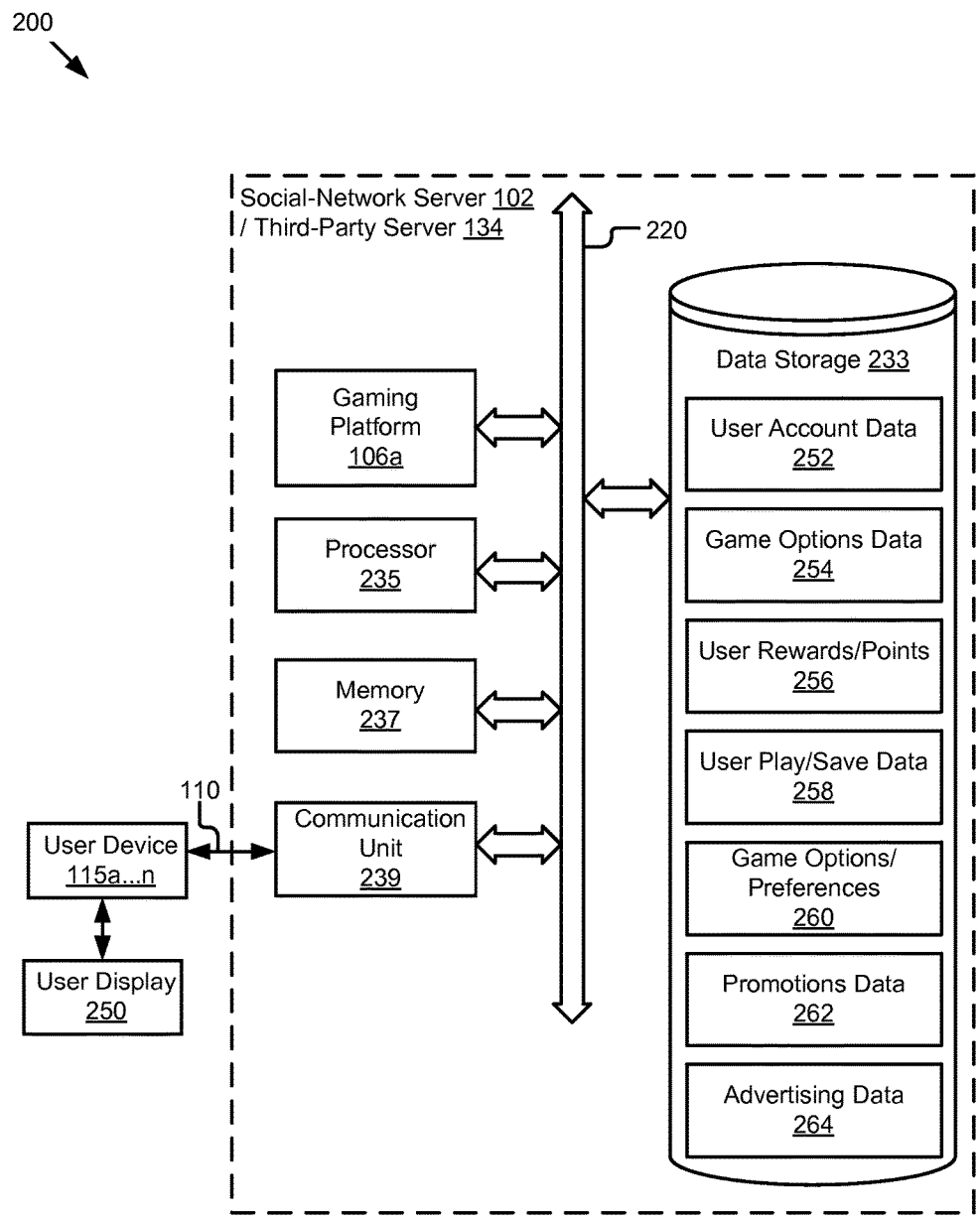
FIG. 2 is a block diagram illustrating some embodiments of a social network server or a third party server (associated with a social network) shown in FIG. 1, including its hardware components.

FIG. 2 is a block diagram illustrating some embodiments of the social network server 102 (a through n) or third party server 134 (a through n). In FIG. 2, like reference numerals have been used to reference like components with the same or similar functionality that has been described above with reference to FIG. 1. Since those components have been described above that description is not repeated here. The social network server 102a generally comprises one or more processors, although only one processor 235 is illustrated in FIG. 2. The processor is coupled via a bus 220 to memory 237 and database storage 233, which stores user account data 252, game options data 254, user rewards/points 256, user play/save data 258, game options/preferences 260, promotion data 262 and advertising data 264.

In some embodiments, the database storage 233 is a database organized by the hosting server and the user. For each user or player, the data storage 233 stores data on the user and user game plays, etc. For example, this data may include related social network activity such as posts, shares, invitations, status changes, etc., associated with each user engaged in a video gaming application.

A user or player 125a, via a user or gaming device 115a, communicates a request to initiate a gaming application or reacts to a keyword via communication unit 239. The "set up" for a video gaming application is managed by the gaming platform 106a. It should be recognized that the gaming platform 106a (illustrated in the social network server 102a) and 106b (illustrated in the third party server 134a) are shown separately, but include similar functionality, at least for purposes of operating the gaming applications. A user or player display 25 coupled to the user device 115a through n, is configured to provide the video source of the gaming application in one of many formats, high definition graphics, three dimensional formats, etc.

Figure 3:
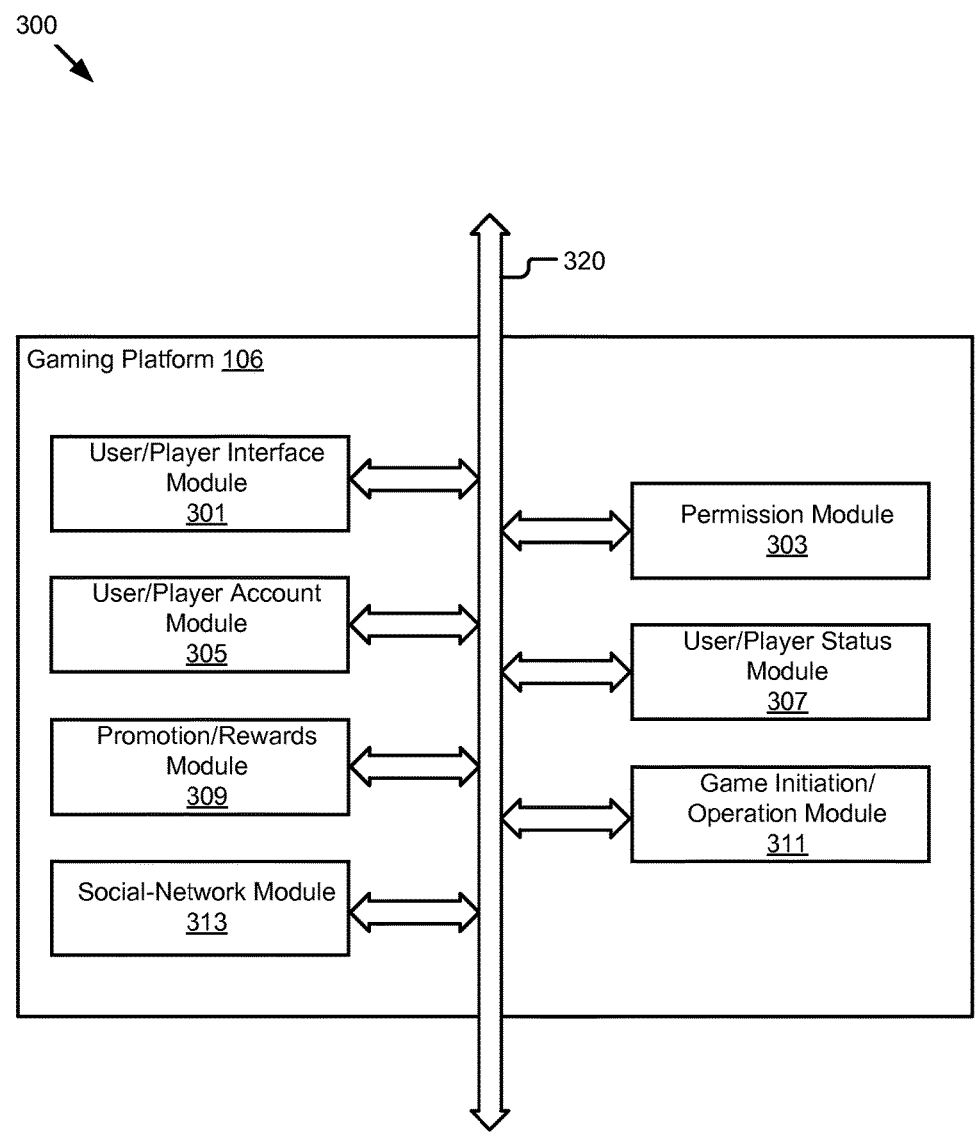
FIG. 3 is a block diagram illustrating some embodiments of a gaming platform shown in FIGS. 1 and 2, and its software components.

Referring now to FIG. 3, like reference numerals have been used to reference like components with the same or similar functionality that has been described above with reference to FIG. 1. Since those components have been described above, that description is not repeated here. The gaming platform 106 (a or b) includes various modules that are programmed to perform the functionalities described here. These modules may be variously distributed or may be in a single unit. The gaming platform 106 includes a user interface module 301, a permissions module 303, a user/player account module 305, a user/player status module 307, a promotion/rewards module 309, a game initiation/operation module 311, and a social network module 313. Each of these modules is coupled to a software communication mechanism 320 to communicate the other modules. Examples of a software communications mechanism 320 may be an object bus (such as COBRA), direct socket communication (such as TCP/IP sockets) among software modules, remote procedure calls, UDP broadcasts and receipts, HTTP connections, function or procedure calls, etc. Further, any or all of the communication could be secure (SSH, HTTPS, etc.). The software communication can be implemented on any underlying hardware, such as a network, the Internet, a bus 220 of FIG. 2, or a combination thereof, etc.

By way of example, a particular user 125a communicates via a user device 115a, to either initiate or react to a game play. The user interface module 301 facilitates a connection of the user device 115a with the social network server 102a, in the event the player wishes to engage or participate in a gaming application via the social network server 102a. The permission module 303 ensures that the user device is compliant with protocols and any privacy concerns. Once a video gaming application has been set up, the user/player account module 305 makes a note of the user to determine if the user has an existing account or must create one. The user/player status module 307 considers the status of the various users ("leader," "follower," or "spectator"). A promotion/rewards module 309 operates the necessary promotions permitting players to earn rewards accorded by the promotions. The game initiation/operation module 311 initiates play and the social network module 313 tracks the applications engaged by a particular player and updates the player's social profile accordingly.

Methods

Figure 4:
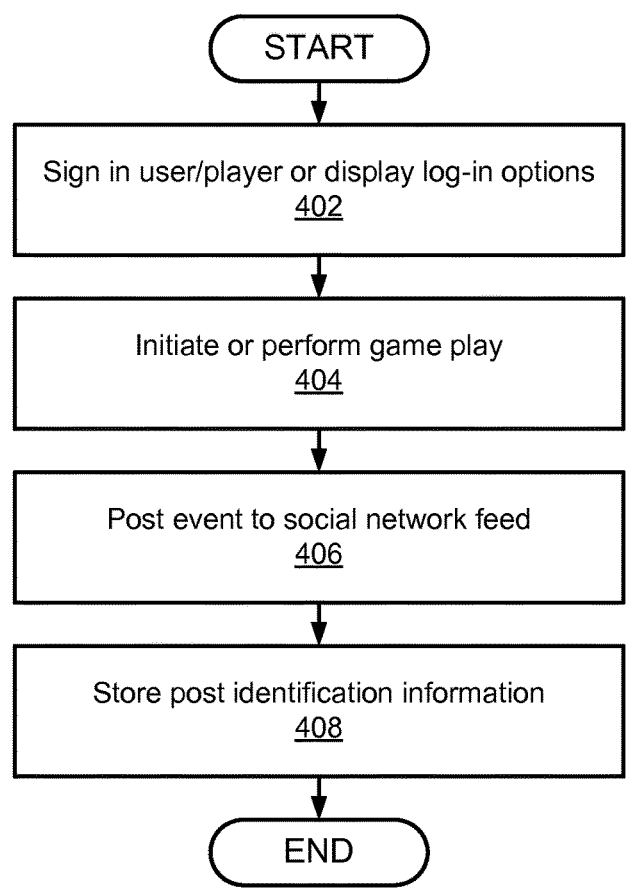
FIG. 4 is a flow chart illustrating an example general method for posting game-play activity on a social network.

FIG. 4 illustrates an example method for posting game-play activity on a social network. It should be understood that the order of the operations in FIG. 4 is merely by way of example and may be performed in different orders than those that are illustrated and some operations may be excluded, and different combinations of the operations may be performed. In the example method illustrated, one or more operations may include signing in or displaying log-in options, as illustrated by block 402. The method 400 then proceeds to the next block 404 and may include one or more operations to initiate or perform game play. The method 400 then proceeds to the next block 406 and may include one or more operations to post an event to a social network feed. The method 400 then proceeds to the next block 408 and may include one or more operations to store post identification information.

Figure 5:
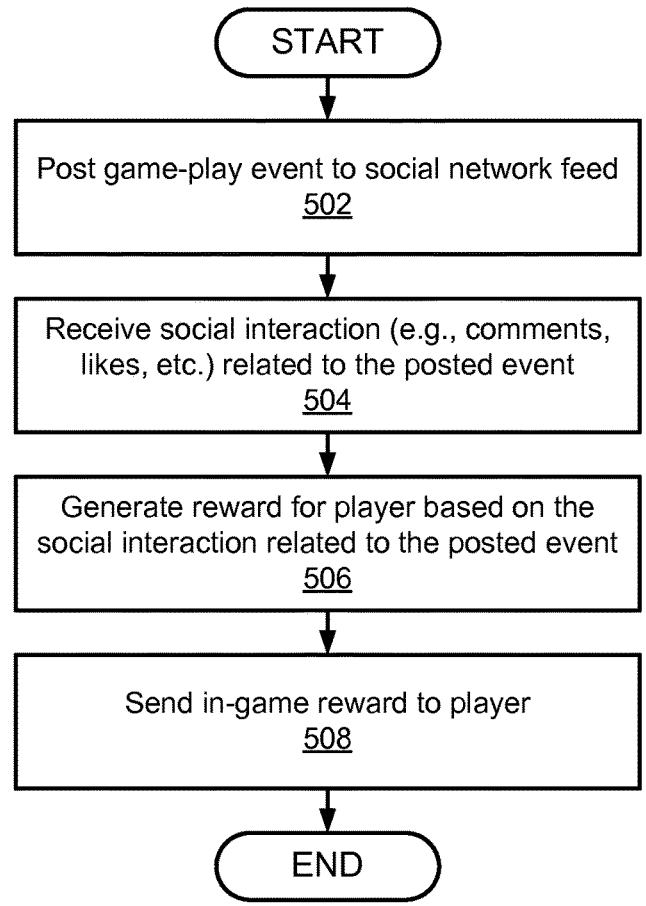
FIG. 5 is a flow chart illustrating an example general method for interacting with a game based on social network activity.

FIG. 5 illustrates an example method for interacting with a game based on social network activity. It should be understood that the order of the operations in FIG. 5 is merely by way of example and may be performed in different orders than those that are illustrated and some operations may be excluded, and different combinations of the operations may be performed. In the example method illustrated, one or more operations may include posting game-play event to the social network feed, as illustrated by block 502. The method 500 then proceeds to the next block 504 and may include one or more operations to receive social interaction (e.g., comments, likes, etc.) related to the posted event. The method 500 then proceeds to the next block 506 and may include one or more operations to generate a reward for the player based on the social interaction related to the posted event. The method 500 then proceeds to the next block 508 and may include one or more operations to send in-game reward to player.

Figure 6:
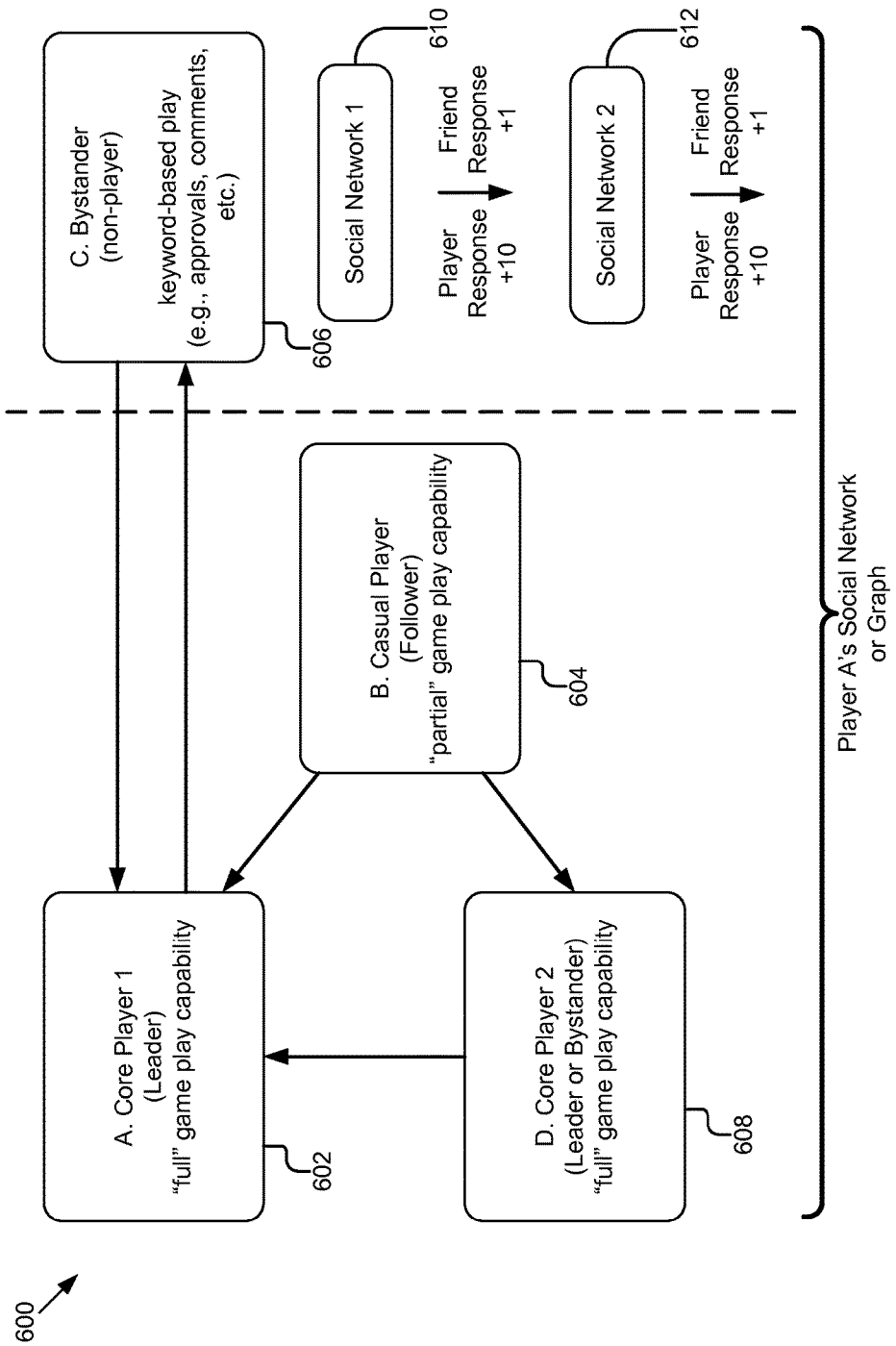
FIG. 6 is a graphical representation of a particular user's (Player A) social network or social graph.

FIG. 6 illustrates a video gaming scenario, with two core players 1 and 2 (at A and D), who have a "leader" status, indicated by reference numerals 602 and 608. A "casual" player or "follower" (at B) is illustrated by reference numeral 604 and has the capability to influence both the core players, as indicated by the arrows. Additionally, a "core" player, for example, Player 2, can participate as a "bystander" as well and influence another "core" player, Player 1. A non-player or "bystander" also participates (at C), providing keyword-based participation, as indicated by reference numeral 606. All the various players interact with each other, some having larger impact (those that are "leader" or "core" players) on the play of another "core" player, whereas a "casual" player has a smaller or little impact on the play of others, and a "bystander" has even less impact.

As one example, a religious gaming application is described here. A "core" player may create his or her own church or organization. Another "core" player 2 may create his or her own church or organization as well. The "casual" player 3 may be a follower of both "core" Player 1 and Player 2, such that acts by the "follower" either enhance or detract a play by Player 1 or Player 2. By way of example, the follower Player 3 may give virtual money ($10 per day out of a $20) to each of the core players. Circumstances may change this flow of money, for example, "core" Player 2 upsets follower Player 3, who routes all of his virtual money to Player 1. Player 2 may retaliate against Player 3, by initiating an action against Player 1, creating a deficit in his or her account, thereby impacting the play by Player 1. Likewise, the bystander C may continue to influence plays by Player 1 or Player 2. Finally, FIG. 6 illustrates a social network 1, illustrated by reference numeral 610 and a social network 2 illustrated by reference numeral 612, each indicating Player responses and friend responses in Player A's social network or social graph.

Figure 7:
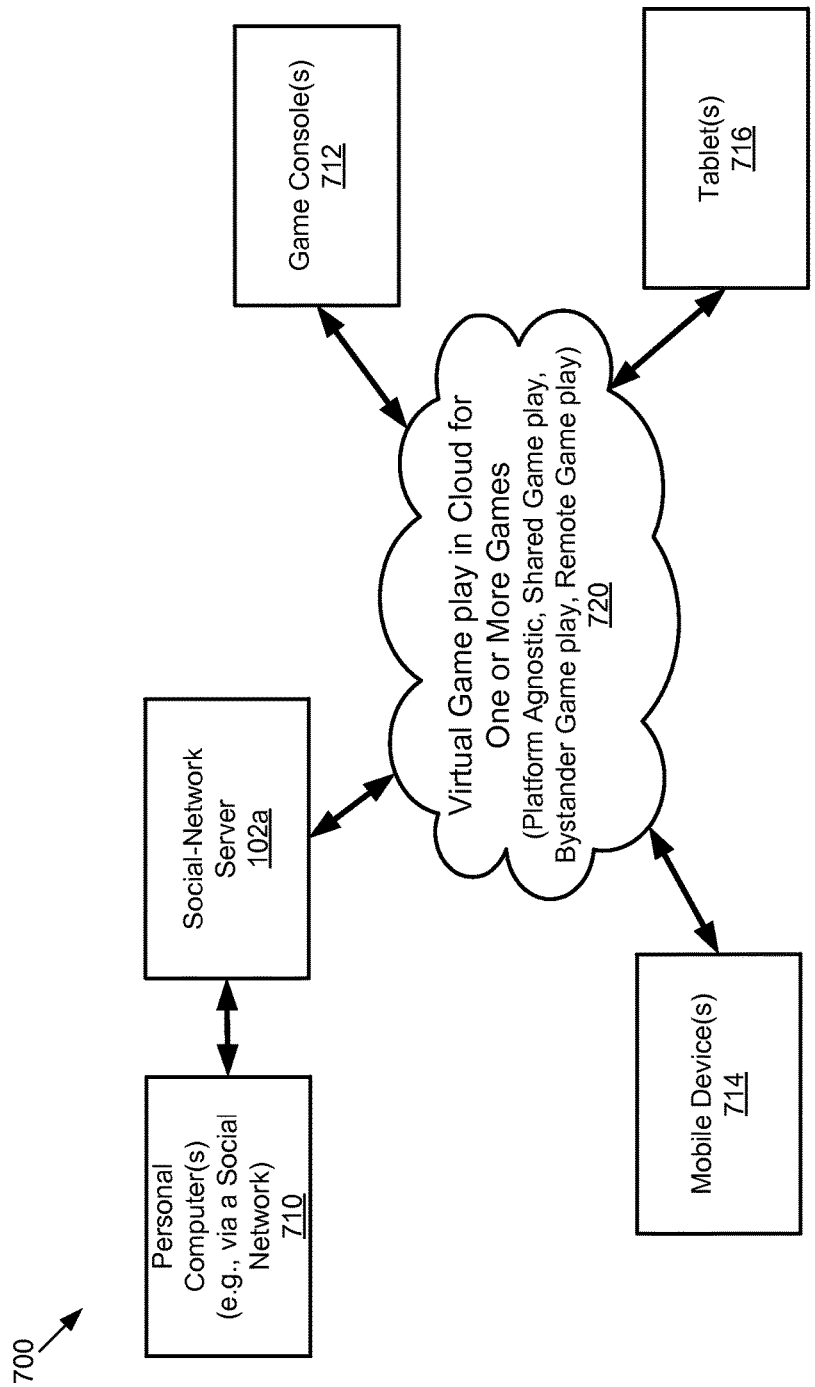
FIG. 7 is a graphical representation illustrating some embodiments of multiple devices connected for centralized game play.

FIG. 7 is a graphical representation 700 illustrating some embodiments of multiple devices connected for centralized game play in a gaming application linked with a social network. For example, multiple user devices may be connected to a virtual game-play cloud 720. The multiple user devices may be all the same or different and may include, for example, one or more personal computers 710 via a social network server 102a, one or more game consoles 712, one or more mobile devices 714, and one or more tablets 716. All or some of these devices are connected to the virtual game-play cloud for platform agnostic, shared, and synchronized gameplay.

Figure 8:
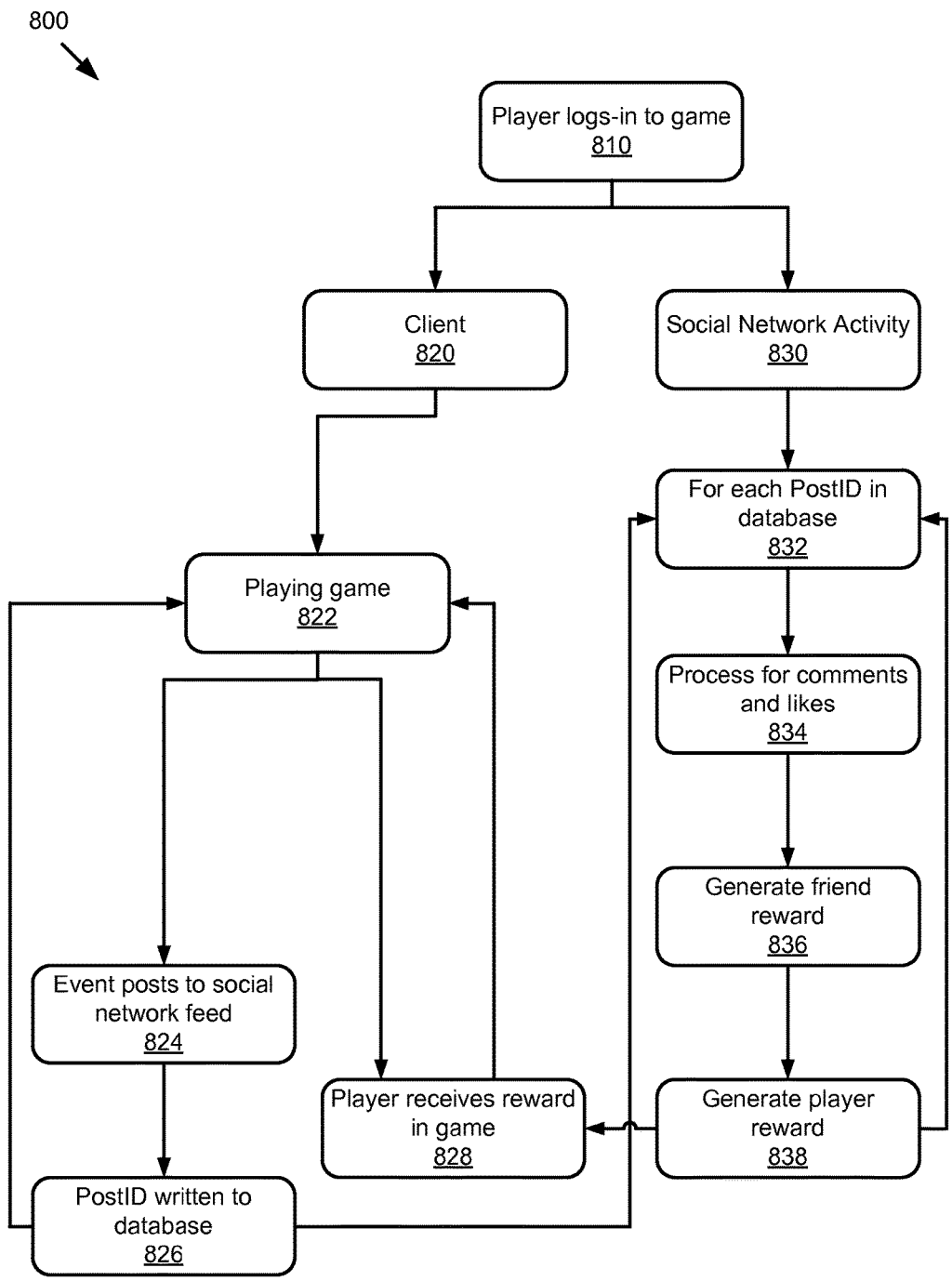
FIG. 8 is a graphical representation illustrating some embodiments of receiving an in-game reward based on social network activity.

FIG. 8 is a graphical representation 800 illustrating some embodiments of receiving an in-game reward based on social network activity. In some implementations, in-game rewards (experience, coins, special game events etc.) may be triggered by the player's friends commenting or interacting with the player's game activity wall post. For example, the player signs in/logs-in to the game illustrated by block 810. Simultaneously the player is logged into the client (that hosts the game application) and the social network to perform social network activity illustrated by blocks 820 and 830. While logged-in to the client, the player may participate in game play, as illustrated by block 822. While playing the game, the player may post an event to a social network feed, as illustrated by block 824 at which point the postID (for access) is written to a database, as illustrated by block 826. Also while playing the game, the player may receive an in-game reward, as illustrated by block 828.

In the social network, when the postID (for access) is written to a database, as illustrated by block 826, the social network application (e.g., game application) loops through all postIDs generated in the game, as illustrated by block 832. The social network application then processes each post for comments and likes, as illustrated by block 834. The social network application then generates a friend reward within the social network, as illustrated by block 836. The social network application then generates a player reward, as illustrated by block 838 which also sends a request to the game to give the reward to the player in the game.

Figure 9:
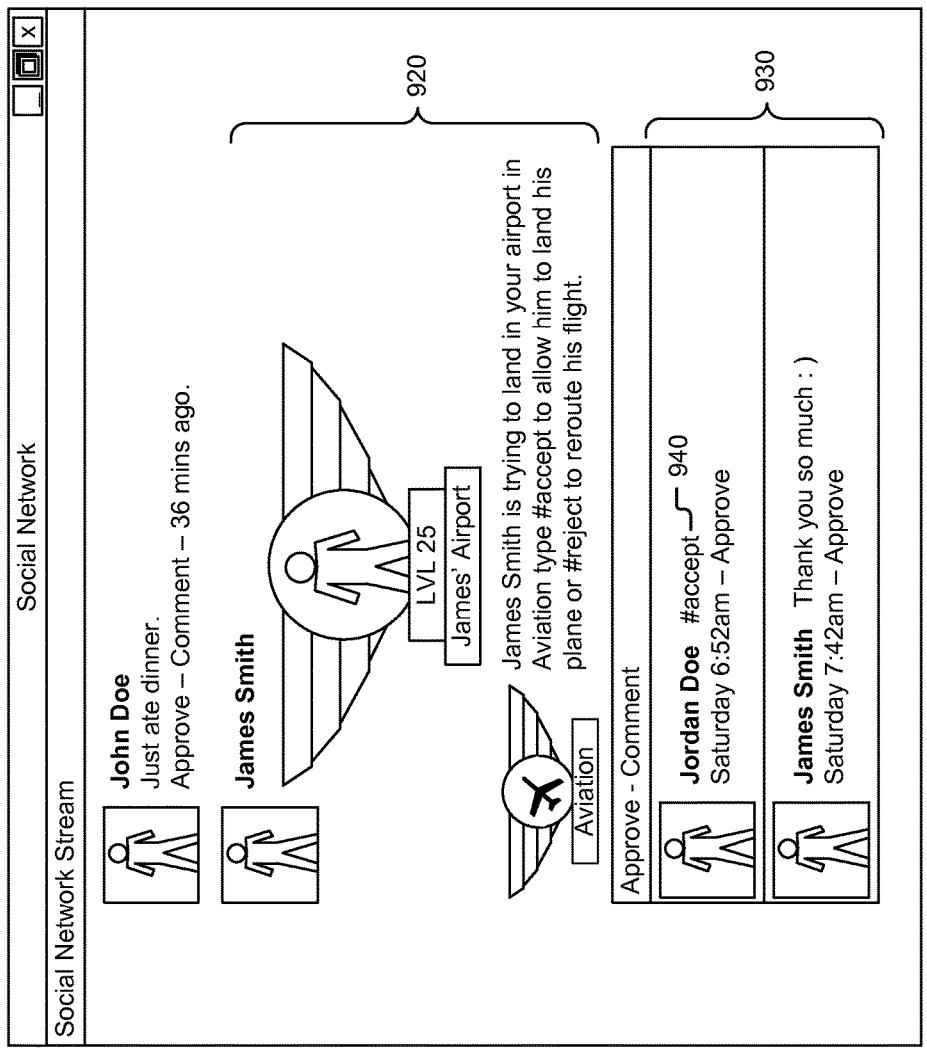
FIG. 9 is a graphical representation illustrating some embodiments of a user interface for interacting with a game via a social network including accepting a virtual request.

FIG. 9 illustrates an example of the user interface display 900 to a user in the event a video gaming application is hosted or accessed by a social network. A user may accept a request via posting a comment (#accept in this example) to the social network post. User posts are indicated by 910, user activities or operations during play are indicated by 920, and user acceptances (indicated by reference numeral 940) and approvals are indicated by reference numeral 930.

Figure 10:
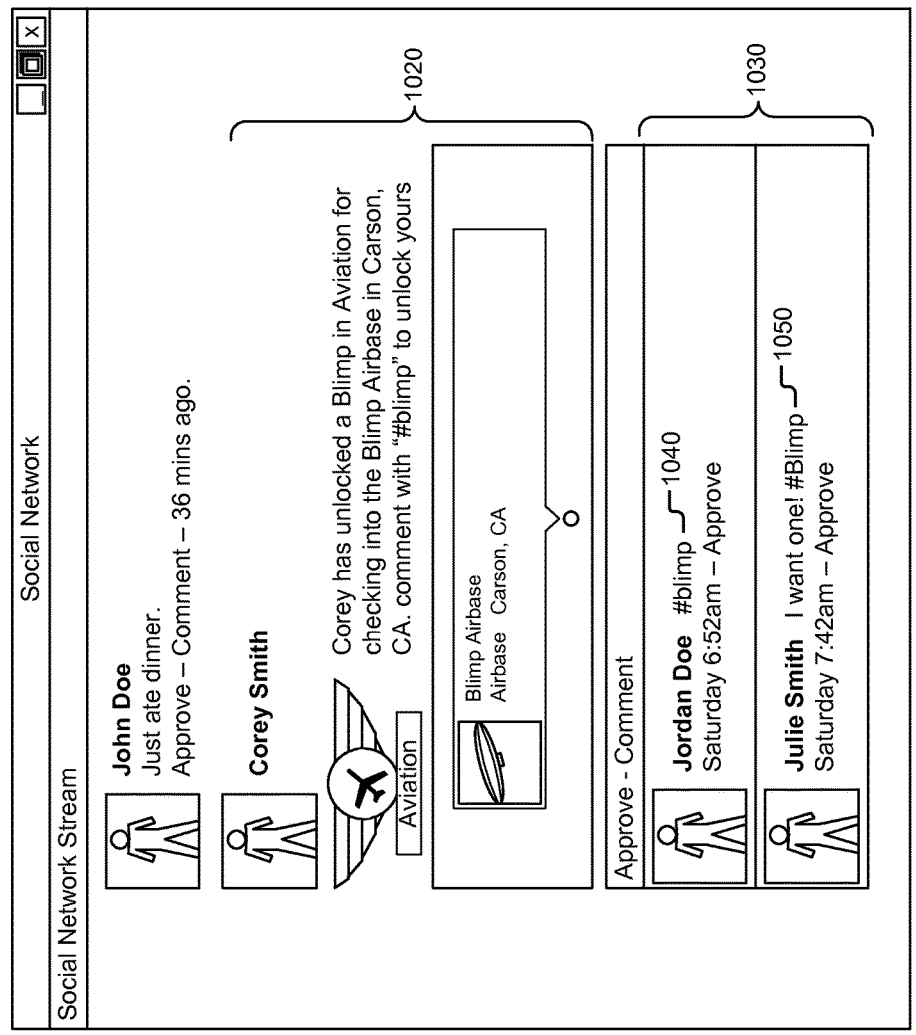
FIG. 10 is a graphical representation illustrating some embodiments of a user interface for interacting with a game via a social network including unlocking new content.

FIG. 10 illustrates an example of a user interface 1000 for unlocking game play content within the game. A user may unlock in-game content by posting a comment on a player's social network post. A friend's activities and status during a game are indicated by 1020, and promotion approvals are indicated by 1030. Approvals may be by the user's friends 1040 and 1050.

As one example, an aviation video gaming application is described here. The specific rules of the social network aspect of the aviation gaming application (e.g., AviNation) are indicated below, simply by way of example:
GPS/Check-in Game Play—Airport Specific
Player must log back into the game to collect all that they have earned every time someone posts. If not, they are subject to losing benefits (see comments)
  1. Airport Check-ins (only players who are playing the game):
    1. For the player who checks in receives:
      1. Passengers (e.g. Extra 10/100)—[can only check-in to same airport once per day]
      2. Virtual currency (e.g. $10,000) [automatically added to players account]
      3. Either experience or energy points (not both)
    2. For the players who "like" the check-in:
      1. The player who checked in receives:
        1. Passengers
        2. Energy points
      2. The player who clicked "like" receives:
        1. Additional passengers
        2. Energy points
      3. Non-Players who "like" the check-in, the main player is awarded a fraction of passengers/energy (e.g., ⅕ or less)
    3. Comments (Key Words)—each player can only post one key word—subsequent posts from the same player are ignored.
      1. "Oversold"
        1. Each player of AviNation receive 10% of the passengers that the primary check-in player has earned but not collected yet;
        2. Each non-player results in a loss of one-passenger from the primary check-in player has earned but not collected yet;

2. "Flight Cancelled"
   1. Player who first posts this that plays AviNation receives all of the passengers that the primary check-in player has earned but not yet collected;
   2. Player who second posts this receives all the energy a player has earned upon check-in but has not yet collected;
3. "Mechanical"—anyone can post
   1. One of the check-in player's aircraft must be repaired (random aircraft) before it can fly again—only one airplane can be affected and only once by a player.
4. "Frequent Flyer"
   1. Each player of AviNation receives a 10% passenger bump for the day; check-in player receives a 10% bump on uncollected passengers Airport specific check-ins should be focused on passengers, money, and possibly experience or energy (not both).

Player Wall Post of a New Route Established

Figure 11A:
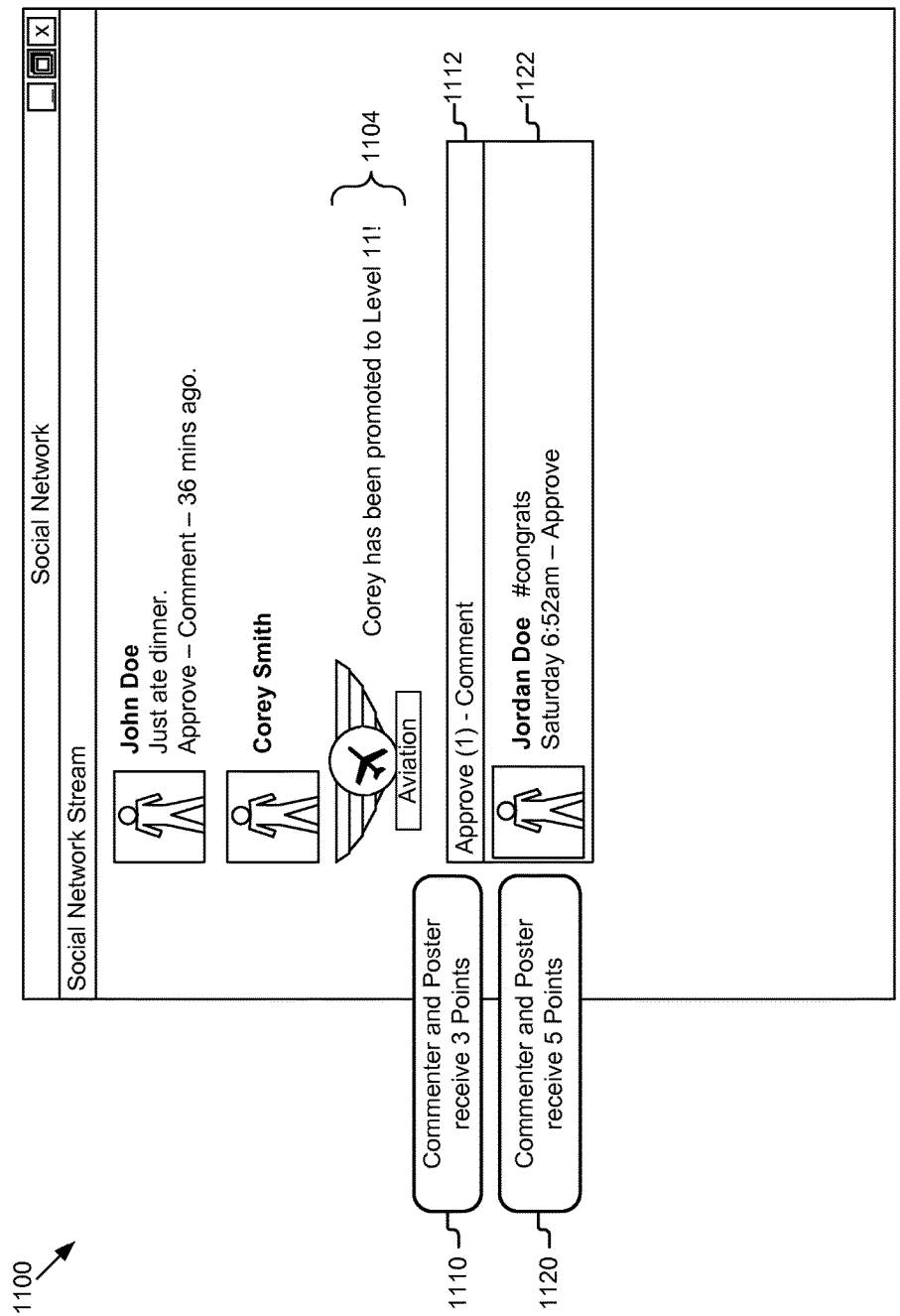
FIG. 11A is a graphical representation illustrating some embodiments of a user interface for interacting with a game via a social network including players commenting on a player promotion within the game.

For players advertising a new route on their wall:
1. "like" post:
   1. Player who posted the new route receives:
      1. New passengers for the day (player must log in to collect)
      2. Experience or Energy (not both)
   2. Player who "liked" the post that plays the game receives:
      1. Certain number of passengers for the day
   3. Non-players who "like" the post add ⅕ (or minimum number) of the passengers (e.g., 1)
2. Comments (key words):
   1. "Oversold"
      1. Each player of AviNation receive 10% of the passengers that primary check-in player has earned but not collected yet;
      2. Each non-player results in a loss of one-passenger from the primary check-in player has earned but not collected yet;
   2. "Flight Cancelled"
      1. Player who first posts this that plays AviNation receives all of the passengers that the primary check-in player has earned but not yet collected;
      2. Player who second posts this receives all the energy a player earned upon check-in but has not yet collected;
   3. "Mechanical"—anyone can post
      1. One of the check-in players aircraft must be repaired (random aircraft) before it can fly again—only one airplane can be affected and only once by a player.
   4. "Frequent Flyer"
      1. Each player of AviNation receives a 10% passenger bump for the day; check-in player receives a 10% bump on uncollected passengers Action of a Player Who Buys a New Airplane:
1. "like"
   1. Player who posted receives:
      1. Additional fuel (free)
   2. Player who "liked" the post receives:
      1. 5 additional passengers
1. Comments (key words):
   1. "Mechanical"—anyone can post
      1. One of the check-in players aircraft must be repaired (random aircraft) before it can fly again—only one airplane can be affected and only once by a player.
   2. "Frequent Flyer"
      1. Each player (original post and respondent) of AviNation receives a 10% passenger bump for the day; check-in player receives a 10% bump on uncollected passengers In general for each action, the following are examples:
1. Each post does NOT have to award a lot of game items to the original poster or the respondent. It is kept in context to what is being posted. Examples:
   1. Setting up a new route may earn experience and passengers
   2. Buying an airplane may award fuel and passengers
   3. Setting up a terminal may award passengers and energy
2. There needs to be competitive play in the spectator wall posts with key words:
   1. Key words that continue to award to the primary poster and also the spectator;
   2. Key words that 'steal' items away from primary poster to respondent player;
   3. Key words that are detrimental to a player (whether completely detrimental or just gives everything not collected to the respondent player)
   4. Key words that are descriptive to the action involved.
3. The "like" button should award items to both players
4. Players who are being awarded items must go back (log-in) to the game to collect them or they are fair game for other players FIG. 11A illustrates an example of a user interface 1100 within a social network with a player notification about one player's promotion within the game and other player comments on the player notification. For example, the post 1104 indicates that the player has been promoted within the game. The notification 1110 indicates that for the approval 1112 from a player, the commenter and the poster receive three points within the game. The notification 1120 indicates that for the comment 1122, the commenter and the poster receive five points within the game.

Figure 11B:
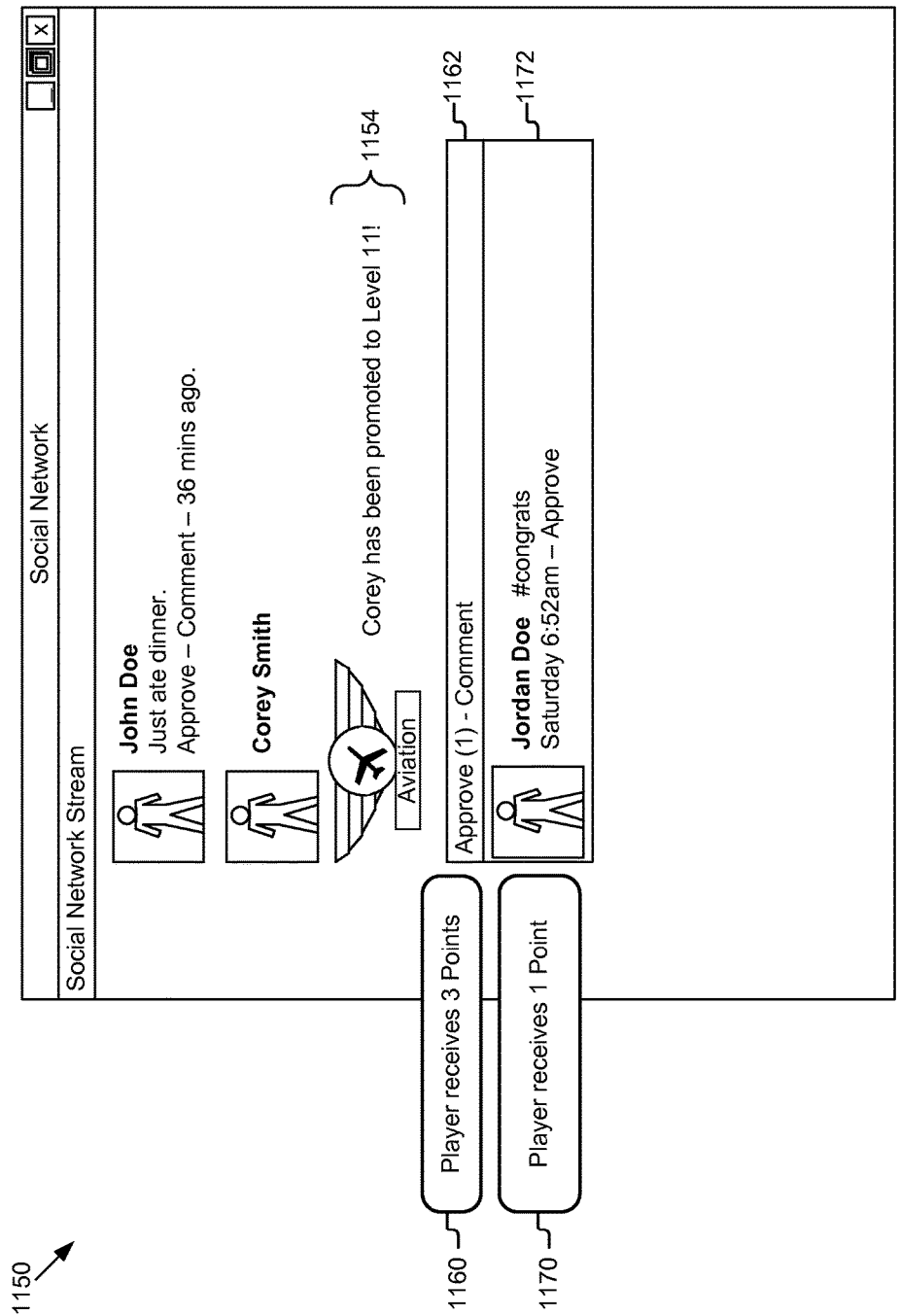
FIG. 11B is a graphical representation illustrating some embodiments of a user interface for interacting with a game via a social network including non-players commenting on a player promotion within the game.

FIG. 11B illustrates an example of a user interface 1150 within a social network with a player notification about one player's promotion within the game and other non-player comments on the player notification. For example, the post 1154 indicates that the player has been promoted within the game. The notification 1160 indicates that for the approval 1162, the player (i.e., poster) receives three points within the game. The notification 1170 indicates that for the comment 1172 from a non-player, the player (i.e., poster) receives one point within the game.

Figure 12A:
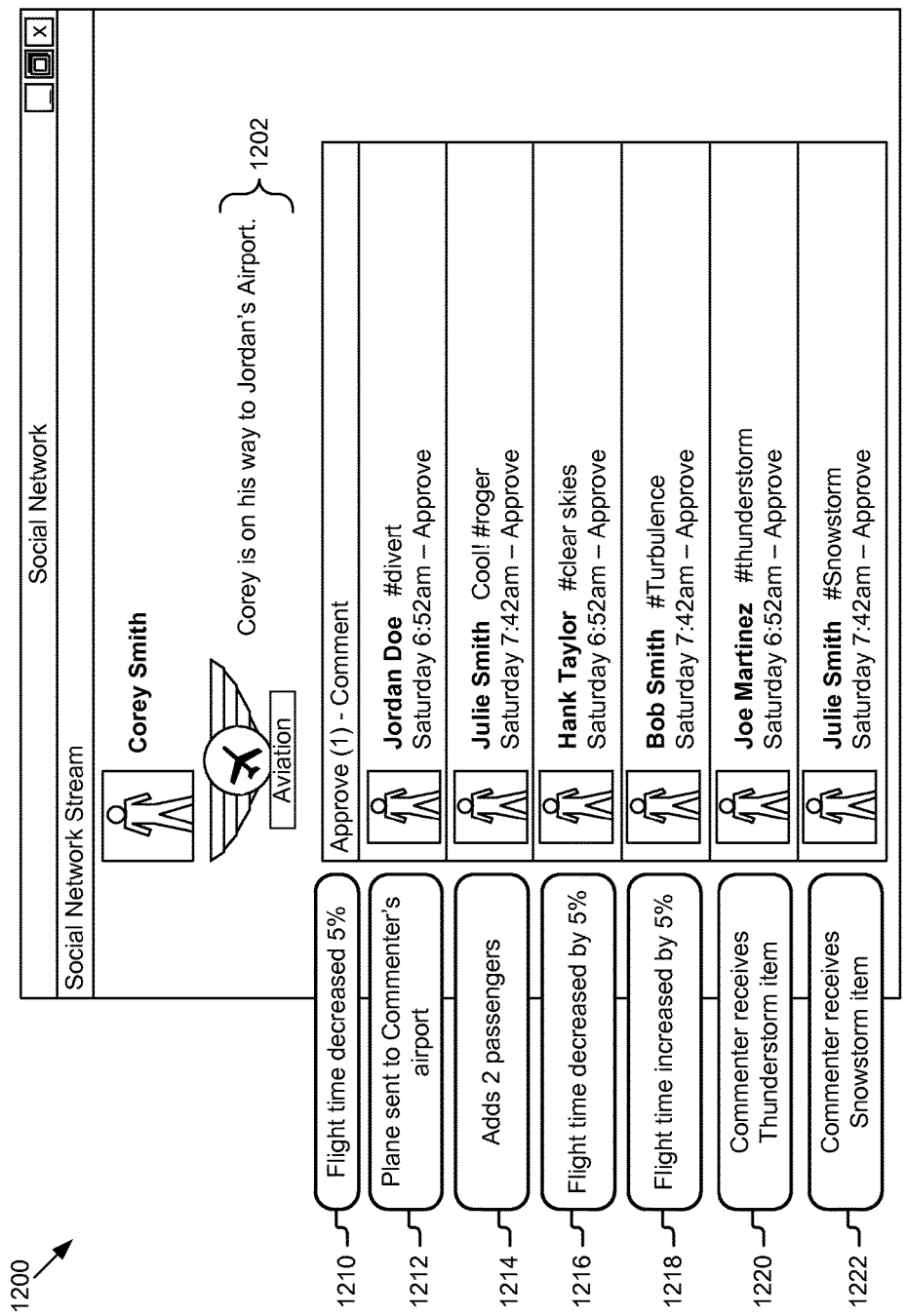
FIG. 12A is a graphical representation illustrating some embodiments of a user interface for interacting with a game via a social network including players commenting on a player's activity within the game.

FIG. 12A illustrates an example of a user interface 1200 within a social network with a player notification about one player traveling to another player's area within the game and other player comments on the player notification. For example, the post 1202 indicates that the player is traveling to another player's airport. The notification 1210 indicates that for the approval, the flight time is decreased by 5%. The notification 1212 indicates that for the comment "#divert" from a player, the airplane is sent to the commenter's airport. The notification 1214 indicates that for the comment "#roger" from a player, the airplane receives two passengers. The notification 1216 indicates that for the comment "#clear skies" from a player, the flight time is decreased by 5%. The notification 1218 indicates that for the comment "#turbulence" from a player, the flight time is increased by 5%. The notification 1220 indicates that for the comment "#thunderstorm" from a player, the commenter receives a thunderstorm item (in-game item). The notification 1222 indicates that for the comment "#snowstorm" from a player, the commenter receives a snowstorm item (in-game item).

Figure 12B:
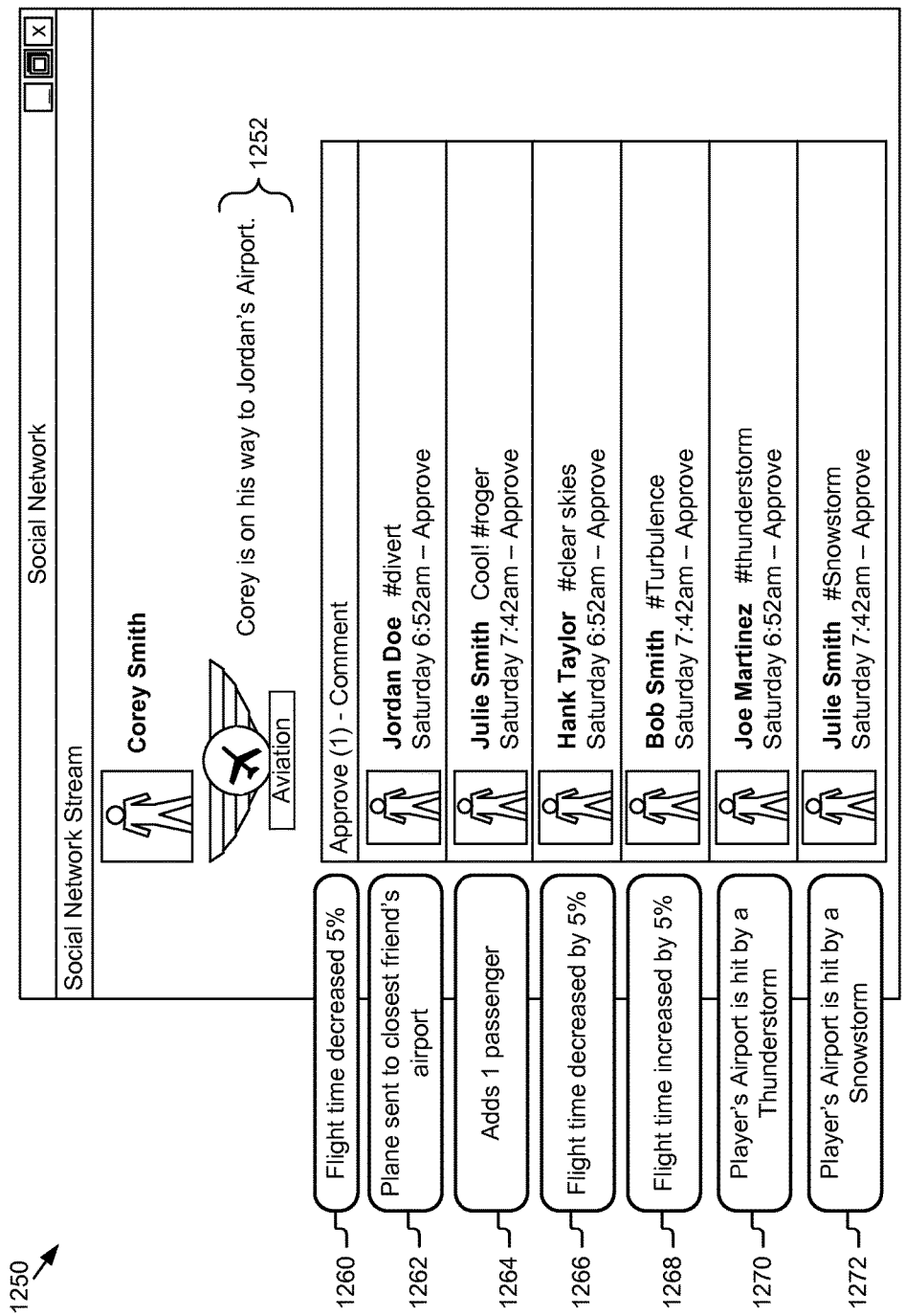
FIG. 12B is a graphical representation illustrating some embodiments of a user interface for interacting with a game via a social network including non-players commenting on a player's activity within the game.

FIG. 12B illustrates an example of a user interface 1250 within a social network with a player notification about one player traveling to another player's area within the game and other non-player comments on the player notification. For example, the post 1252 indicates that the player is traveling to another player's airport. The notification 1260 indicates that for the approval, the flight time is decreased by 5%. The notification 1262 indicates that for the comment "#divert" from a non-player, the airplane is sent to the closest friend's airport. The notification 1264 indicates that for the comment "#roger" from a non-player, the airplane receives one passenger. The notification 1266 indicates that for the comment "#clear skies" from a non-player, the flight time is decreased by 5%. The notification 1268 indicates that for the comment "#turbulence" from a non-player, the flight time is increased by 5%. The notification 1270 indicates that for the comment "#thunderstorm" from a non-player, the player's airport is hit by a thunderstorm. The notification 1272 indicates that for the comment "#snowstorm" from a non-player, the player's airport is hit by a snowstorm.

Figure 13A:
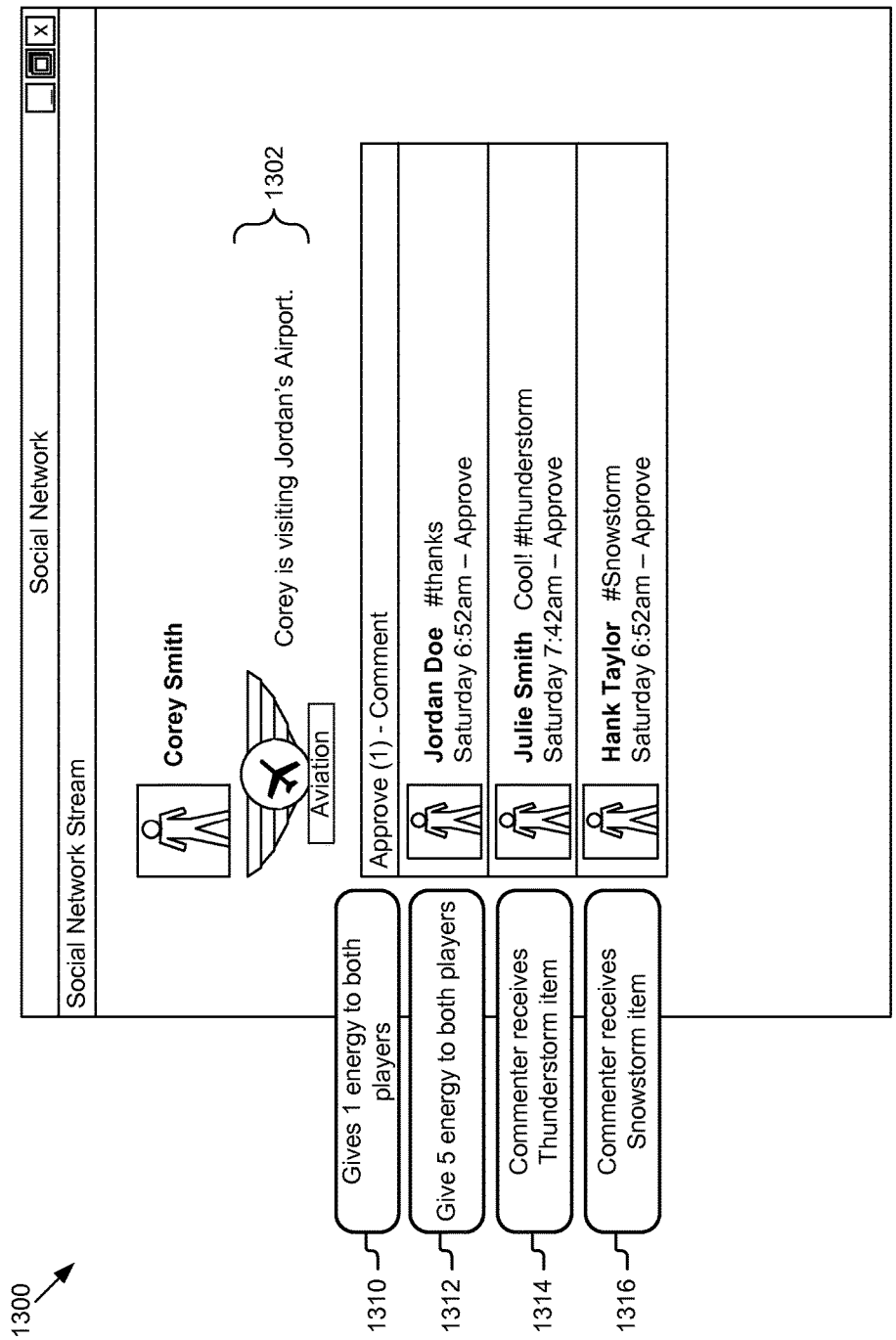
FIG. 13A is a graphical representation illustrating some embodiments of a user interface for interacting with a game via a social network including players commenting on a player visiting another player's virtual area within the game.

FIG. 13A illustrates an example of a user interface 1300 within a social network with a player notification about one player visiting another player's area within the game and other player comments on the player notification. For example, the post 1302 indicates that the player is visiting another player's airport. The notification 1310 indicates that for the approval, one energy point is given to both players. The notification 1312 indicates that for the comment "#thanks" from a player, five energy points are given to both players. The notification 1314 indicates that for the comment "#thunderstorm" from a player, the commenter receives a thunderstorm item (in-game item). The notification 1316 indicates that for the comment "#snowstorm" from a player, the commenter receives a snowstorm item (in-game item).

Figure 13B:
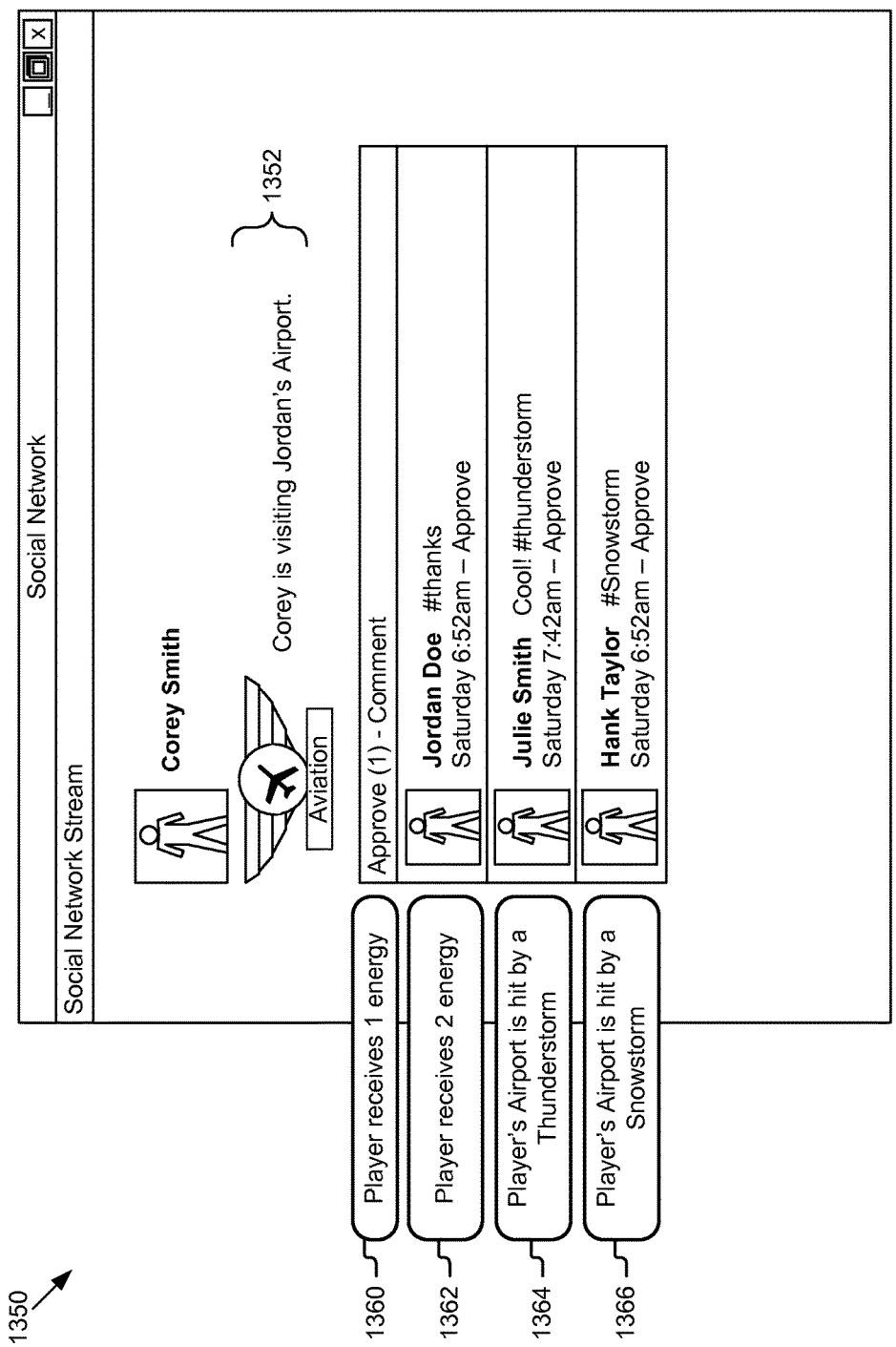
FIG. 13B is a graphical representation illustrating some embodiments of a user interface for interacting with a game via a social network including non-players commenting on a player visiting another player's virtual area within the game.

FIG. 13B illustrates an example of a user interface 1350 within a social network with a player notification about one player visiting another player's area within the game and other non-player comments on the player notification. For example, the post 1352 indicates that the player is visiting another player's airport. The notification 1360 indicates that for the approval, one energy point is given to the player (i.e., poster). The notification 1362 indicates that for the comment "#thanks" from a non-player, two energy points are given to the player (i.e., poster). The notification 1364 indicates that for the comment "#thunderstorm" from a non-player, the player's (i.e., poster) airport is hit by a thunderstorm. The notification 1366 indicates that for the comment "#snowstorm" from a non-player, the player's (i.e., poster) airport is hit by a snowstorm.

Figure 14A:
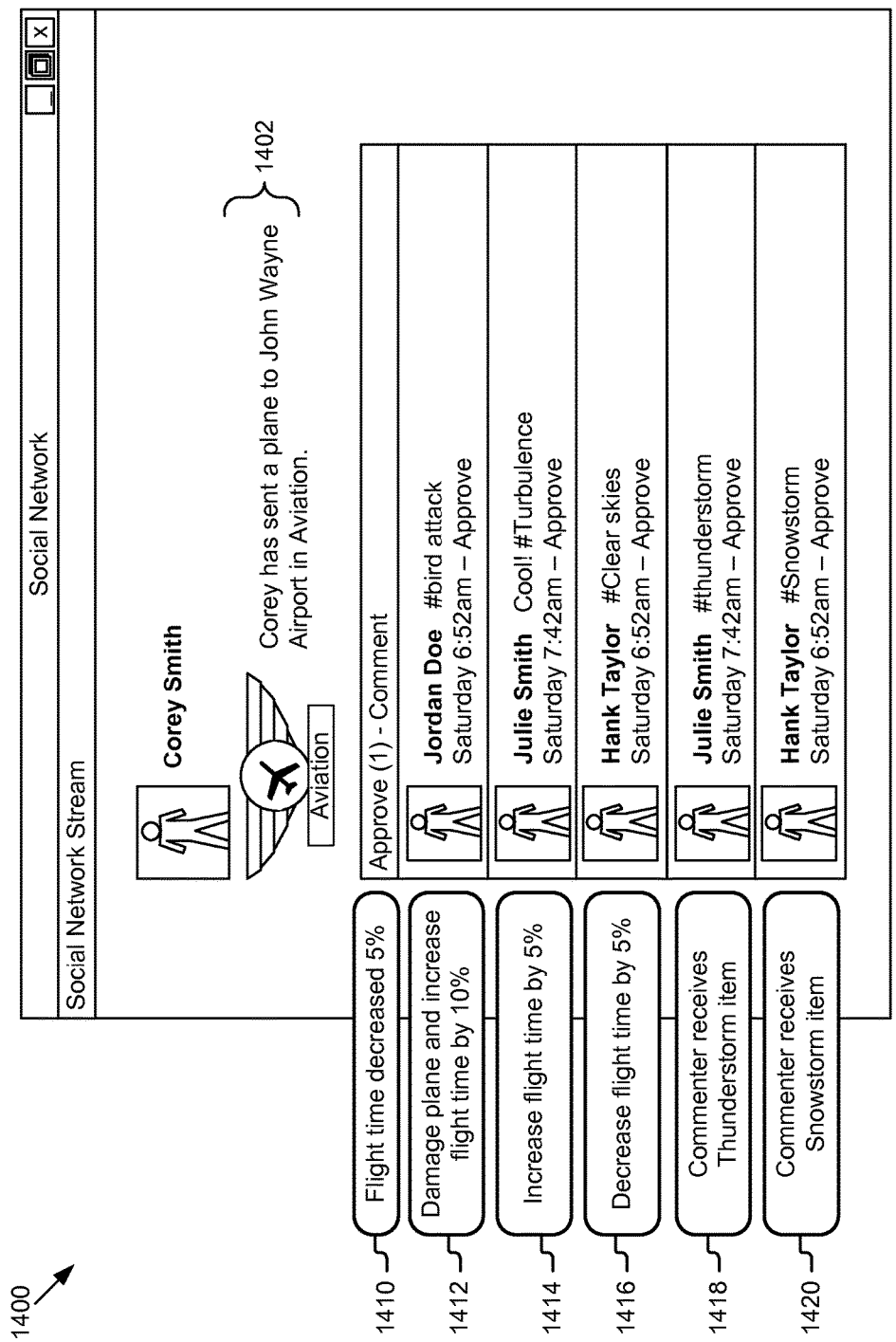
FIG. 14A is a graphical representation illustrating some embodiments of a user interface for interacting with a game via a social network including players commenting on a player sending items within the game.

FIG. 14A illustrates an example of a user interface 1400 within a social network with a player notification about one player sending a game-play item within the game and other player comments on the player notification. For example, the post 1402 indicates that the player has sent an airplane to an in-game airport (in this example John Wayne Airport). The notification 1410 indicates that for the approval, the flight time is decreased by 5%. The notification 1412 indicates that for the comment "#bird attack" from a player, the plane is damaged and the flight time is increased by 5%. The notification 1414 indicates that for the comment "#turbulence" from a player, the flight time is increased by 5%. The notification 1416 indicates that for the comment "#clear skies" from a player, the flight time is decreased by 5%. The notification 1418 indicates that for the comment "#thunderstorm" from a player, the commenter receives a thunderstorm item (in-game item). The notification 1420 indicates that for the comment "#snowstorm" from a player, the commenter receives a snowstorm item (in-game item).

Figure 14B:
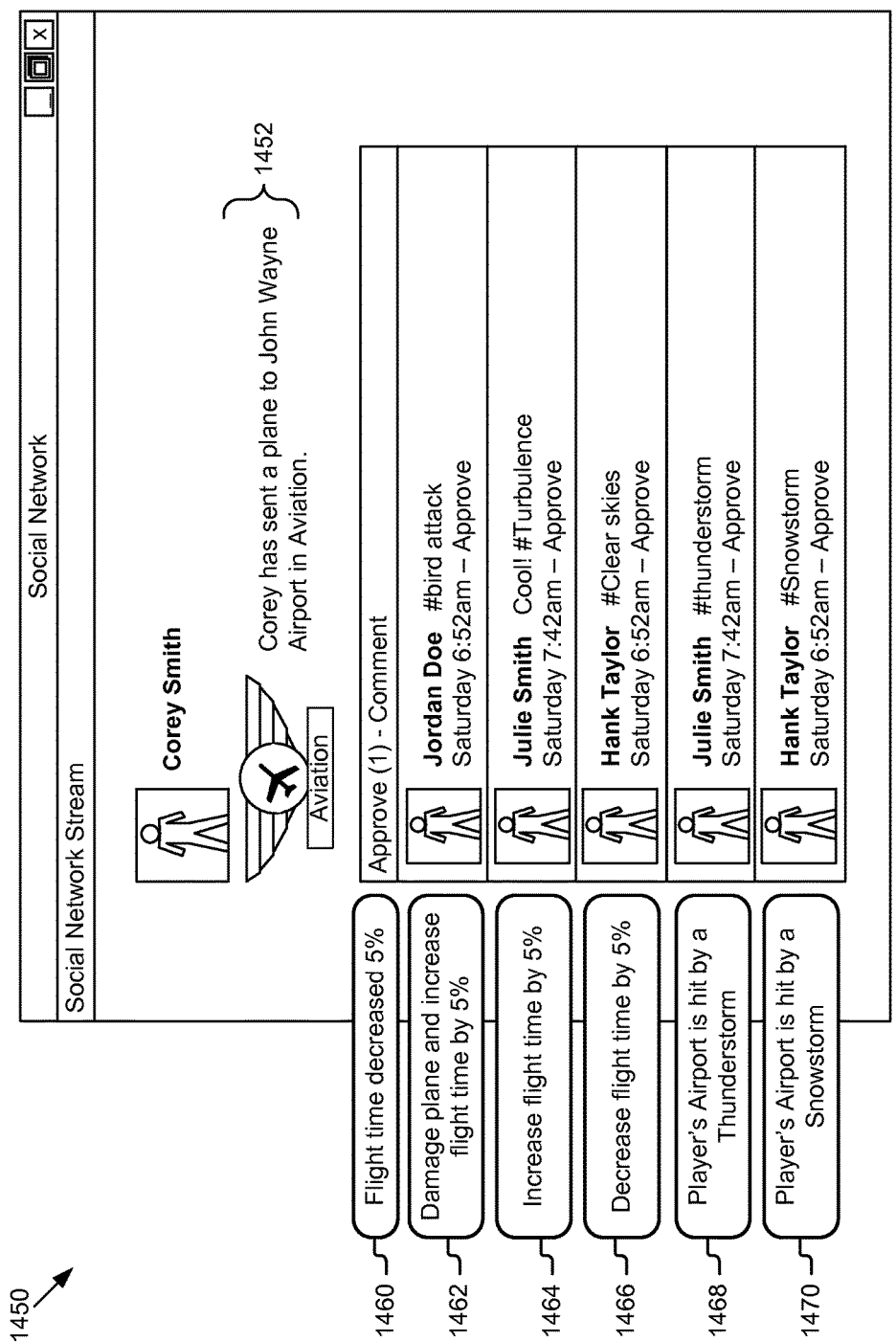
FIG. 14B is a graphical representation illustrating some embodiments of a user interface for interacting with a game via a social network including non-players commenting on a player sending items within the game.

FIG. 14B illustrates an example of a user interface 1450 within a social network with a player notification about one player sending a game-play item within the game and other non-player comments on the player notification. For example, the post 1452 indicates that the player has sent an airplane to an in-game airport (in this example John Wayne Airport). The notification 1460 indicates that for the approval, the flight time is decreased by 5%. The notification 1462 indicates that for the comment "#bird attack" from a non-player, the airplane is damaged and the flight time is increased by 5%. The notification 1464 indicates that for the comment "#turbulence" from a non-player, the flight time is increased by 5%. The notification 1466 indicates that for the comment "#clear skies" from a non-player, the flight time is decreased by 5%. The notification 1468 indicates that for the comment "#thunderstorm" from a non-player, the player's (i.e., poster) airport is hit by a thunderstorm. The notification 1470 indicates that for the comment "#snowstorm" from a non-player, the player's (i.e., poster) airport is hit by a snowstorm.

Figure 15A:
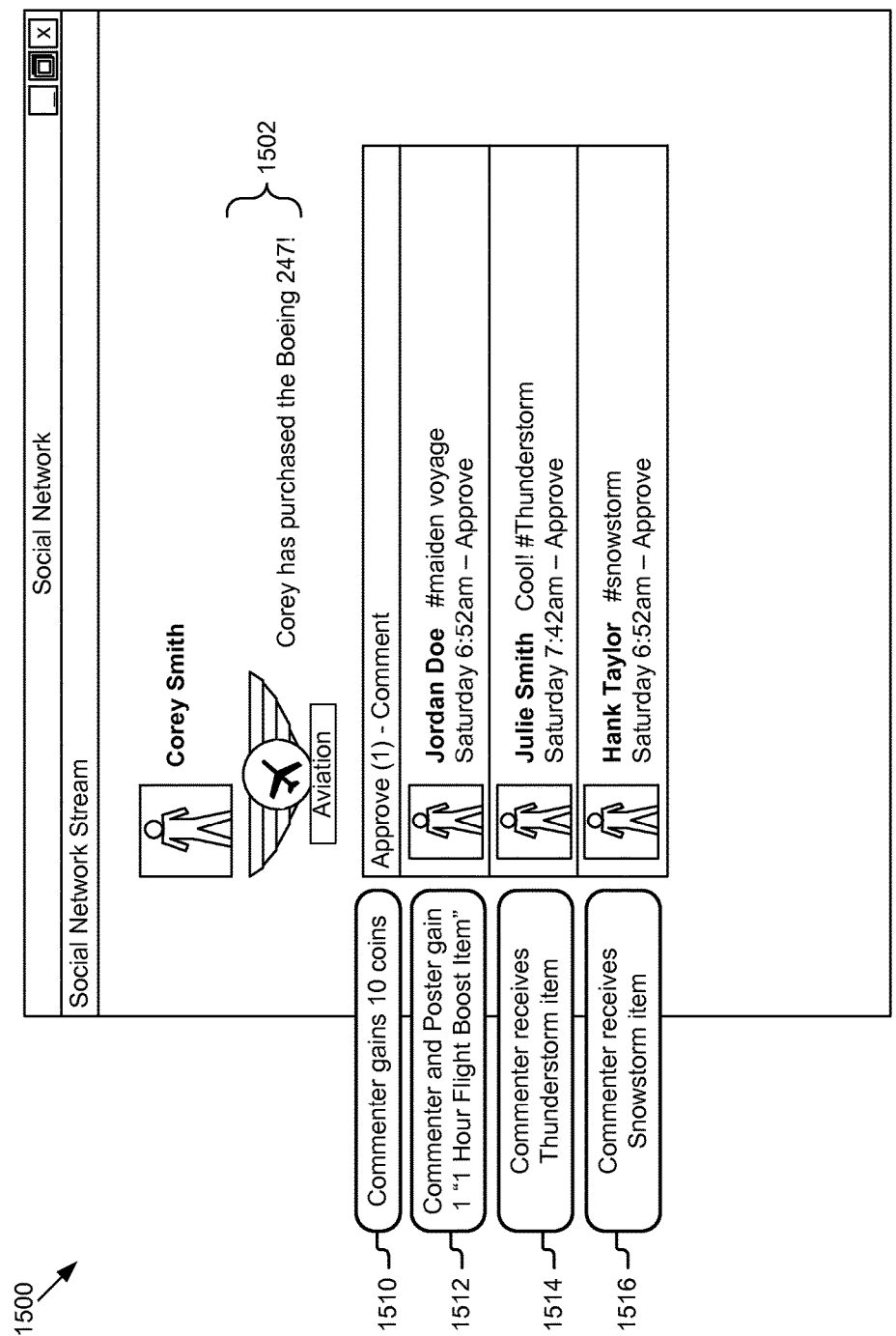
FIG. 15A is a graphical representation illustrating some embodiments of a user interface for interacting with a game via a social network including players commenting on an item purchase within the game.

FIG. 15A illustrates an example of a user interface 1500 within a social network with a player notification about one player purchasing a game-play item within the game and other player comments on the player notification. For example, the post 1502 indicates that the player has purchased an in-game airplane. The notification 1510 indicates that for the approval, the commenter gains 10 coins. The notification 1512 indicates that for the comment "#maiden voyage" from a player, the commenter and the poster gain one "1 hour boost item". The notification 1514 indicates that for the comment "#thunderstorm" from a player, the commenter receives a thunderstorm item (in-game item). The notification 1516 indicates that for the comment "#snowstorm" from a player, the commenter receives a snowstorm item (in-game item).

Figure 15B:
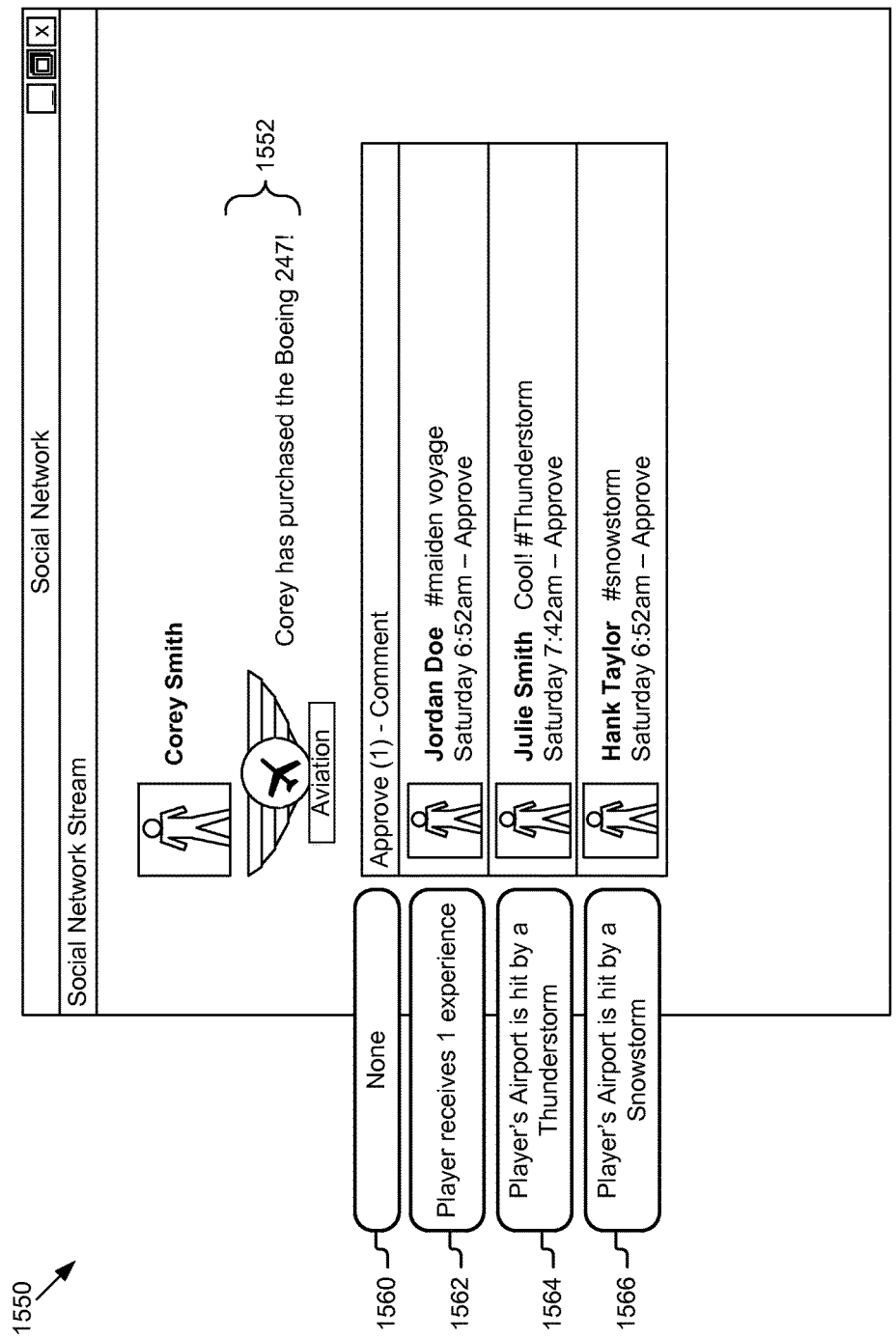
FIG. 15B is a graphical representation illustrating some embodiments of a user interface for interacting with a game via a social network including non-players commenting on an item purchase within the game.

FIG. 15B illustrates an example of a user interface 1550 within a social network with a player notification about one player purchasing a game-play item within the game and other non-player comments on the player notification. For example, the post 1552 indicates that the player has purchased an in-game airplane. The notification 1560 indicates that for the approval, no award is given. The notification 1562 indicates that for the comment "#maiden voyage" from a non-player, the player (i.e., poster) receives one experience point. The notification 1564 indicates that for the comment "#thunderstorm" from a non-player, the player's (i.e., poster) airport is hit by a thunderstorm. The notification 1566 indicates that for the comment "#snowstorm" from a non-player, the player's (i.e., poster) airport is hit by a snowstorm.

Figure 16A:
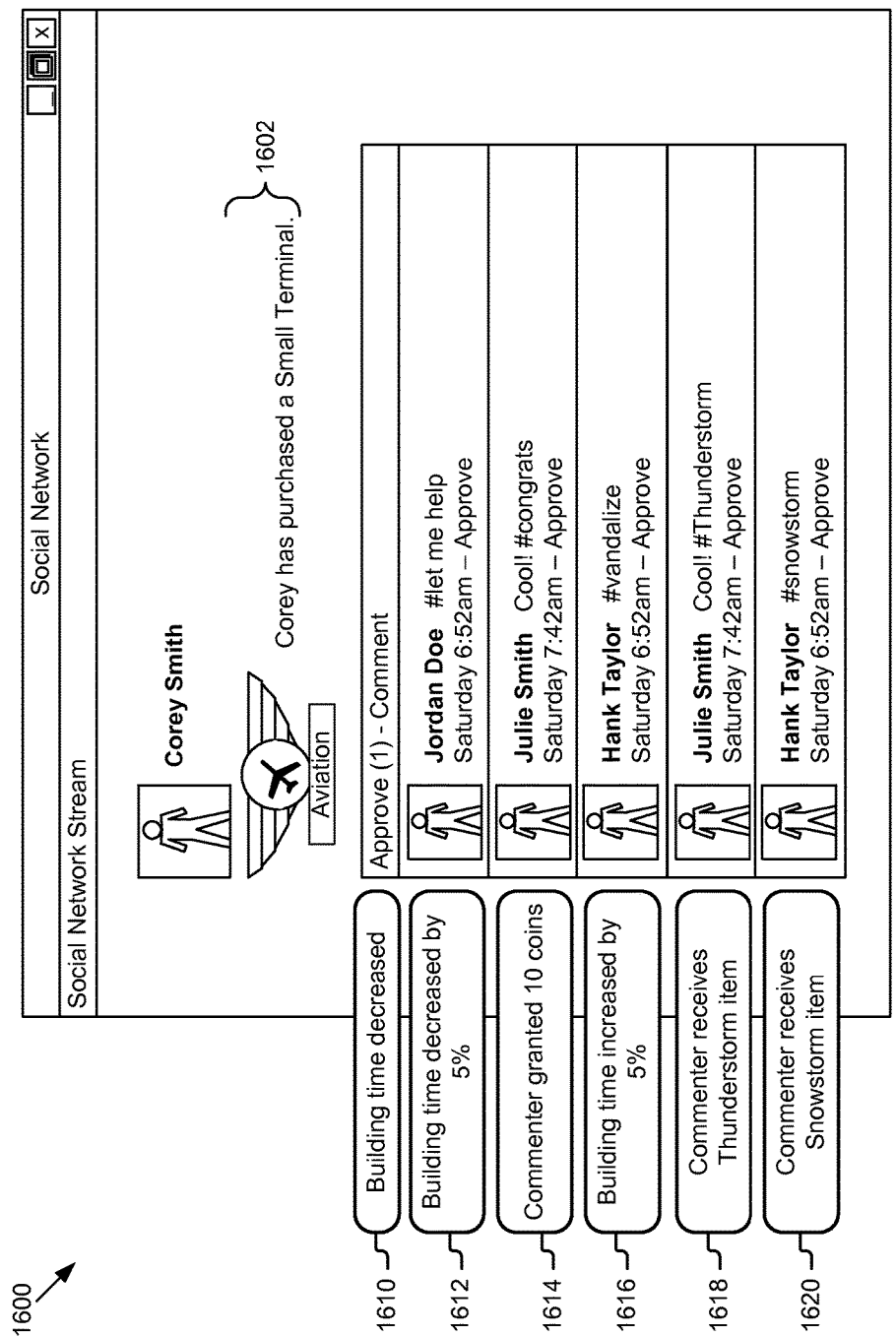
FIG. 16A is a graphical representation illustrating some embodiments of a user interface for interacting with a game via a social network including players commenting on an area purchase within the game.

FIG. 16A illustrates an example of a user interface 1600 within a social network with a player notification about one player purchasing a game-play area within the game and other player comments on the player notification. For example, the post 1602 indicates that the player has purchased a small terminal. The notification 1610 indicates that for the approval, the building time is decreased. The notification 1612 indicates that for the comment "#let me help" from a player, the building time is decreased by 5%. The notification 1614 indicates that for the comment "#congrats" from a player, the commenter is given 10 coins. The notification 1616 indicates that for the comment "#vandalize" from a player, the building time is increased by 5%. The notification 1618 indicates that for the comment "#thunderstorm" from a player, the commenter receives a thunderstorm item (in-game item). The notification 1620 indicates that for the comment "#snowstorm" from a player, the commenter receives a snowstorm item (in-game item).

Figure 16B:
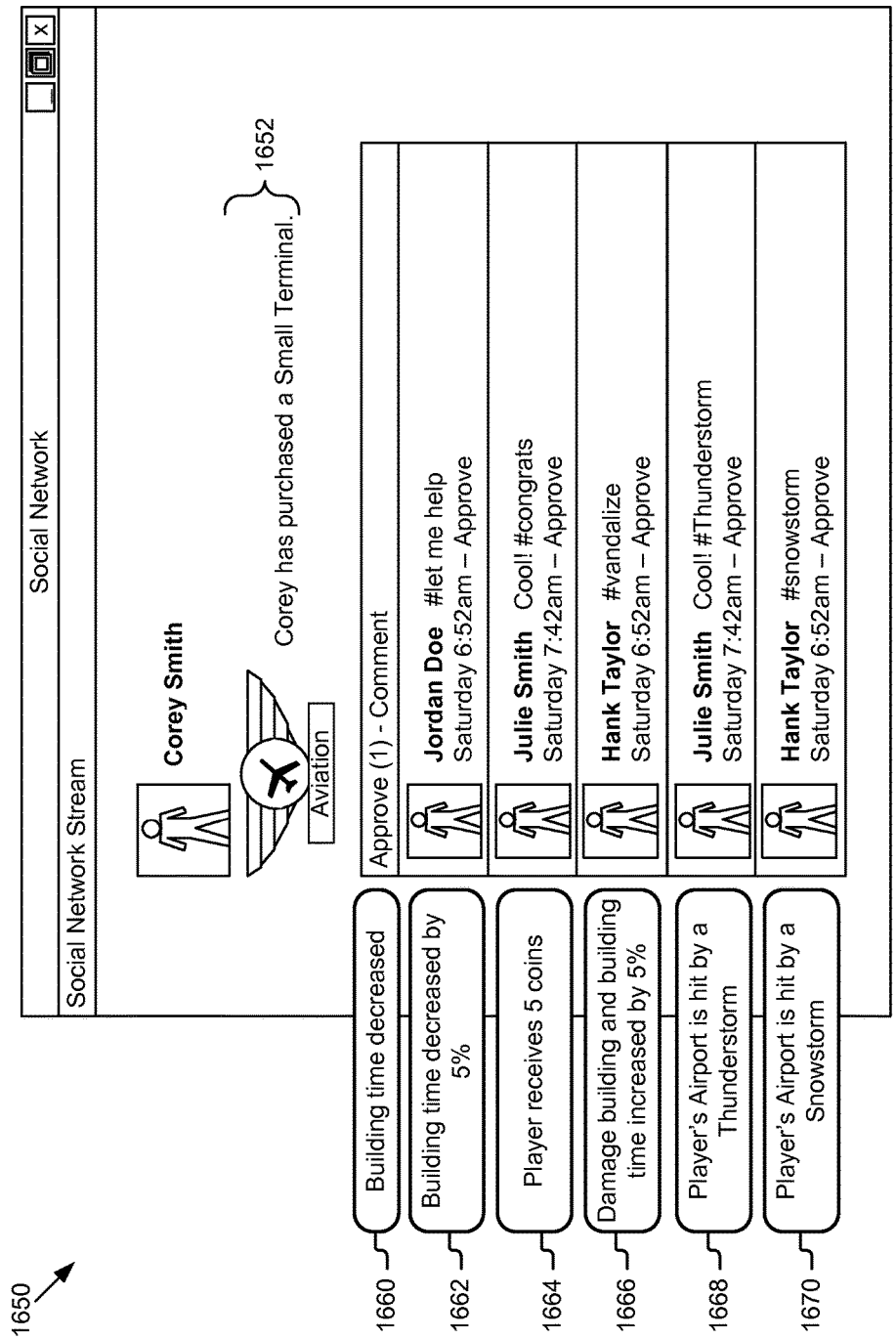
FIG. 16B is a graphical representation illustrating some embodiments of a user interface for interacting with a game via a social network including non-players commenting on an area purchase within the game.

FIG. 16B illustrates an example of a user interface 1650 within a social network with a player notification about one player purchasing a game-play area within the game and other non-player comments on the player notification. For example, the post 1652 indicates that the player has purchased a small terminal. The notification 1660 indicates that for the approval, the building time is decreased. The notification 1662 indicates that for the comment "#let me help" from a non-player, the building time is decreased by 5%. The notification 1664 indicates that for the comment "#congrats" from a non-player, the player (i.e., poster) is given 5 coins. The notification 1666 indicates that for the comment "#vandalize" from a non-player, the building is damaged and the building time is increased by 5%. The notification 1668 indicates that for the comment "#thunderstorm" from a non-player, the player's (i.e., poster) airport is hit by a thunderstorm. The notification 1670 indicates that for the comment "#snowstorm" from a non-player, the player's (i.e., poster) airport is hit by a snowstorm.

Figure 17A:
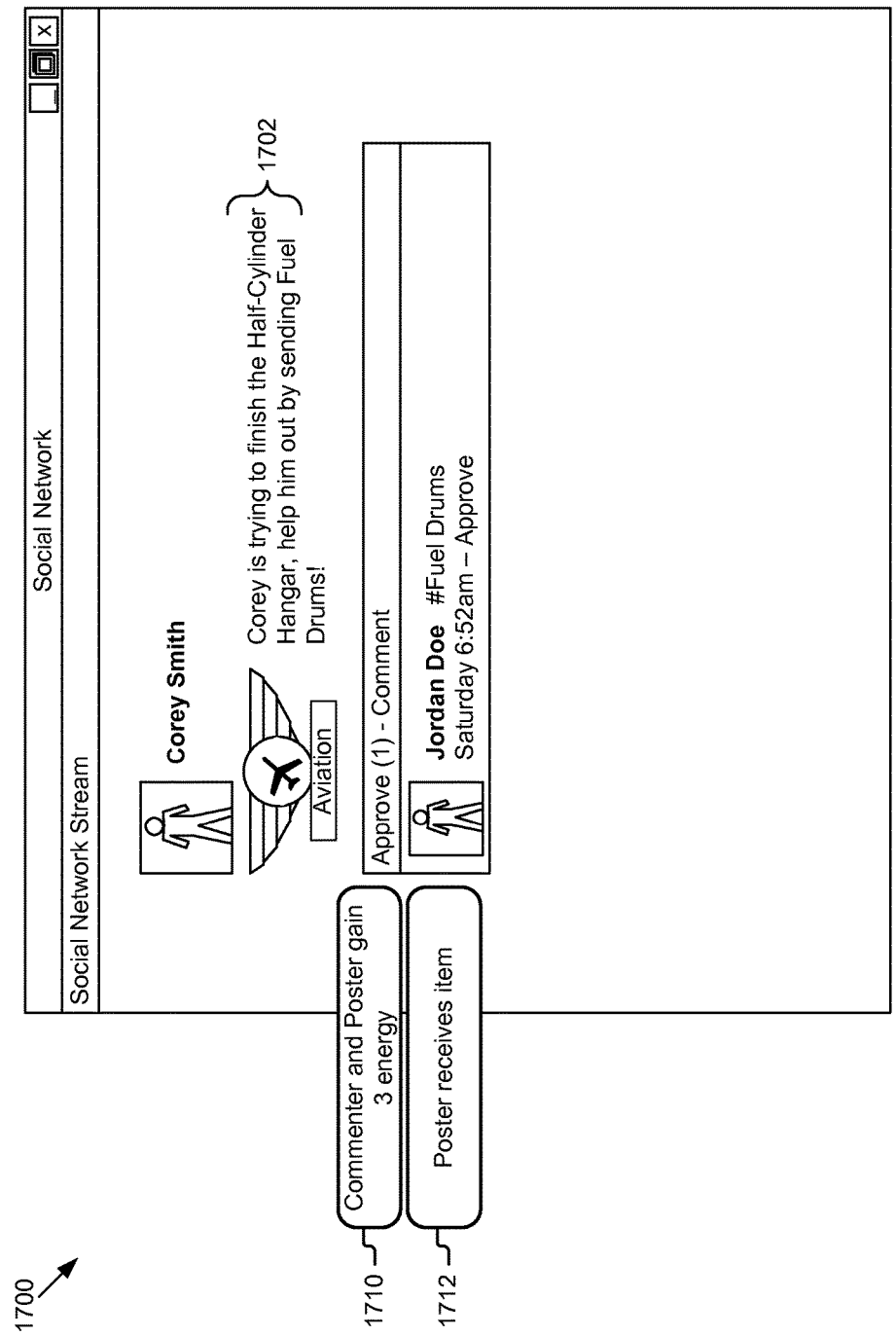
FIG. 17A is a graphical representation illustrating some embodiments of a user interface for interacting with a game via a social network including players commenting on building an item within the game.

FIG. 17A illustrates an example of a user interface 1700 within a social network with a player notification about one player building a game-play item within the game and other player comments on the player notification. For example, the post 1702 indicates that the player is trying to finish building a hangar. The notification 1710 indicates that for the approval, the poster and commenter receive three energy points. The notification 1712 indicates that for the comment "#fuel drums" from a player, the poster receives an in-game item.

Figure 17B:
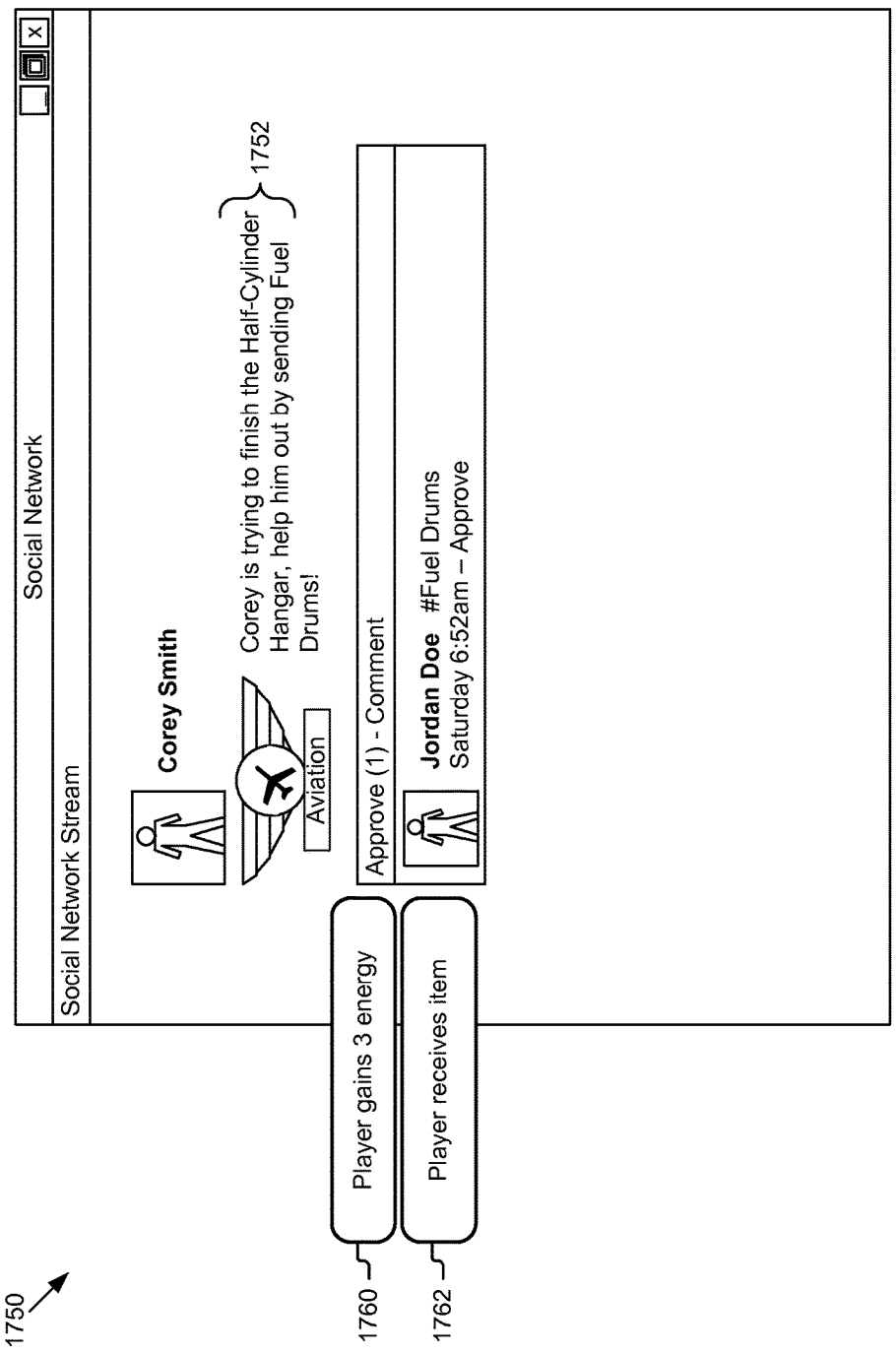
FIG. 17B is a graphical representation illustrating some embodiments of a user interface for interacting with a game via a social network including non-players commenting on building an item within the game.

FIG. 17B illustrates an example of a user interface 1750 within a social network with a player notification about one player building a game-play item within the game and other non-player comments on the player notification. The notification 1760 indicates that for the approval, the player (i.e., poster) receives three energy points. The notification 1762 indicates that for the comment "#fuel drums" from a non-player, the player (i.e., poster) receives an in-game item.

Figure 18A:
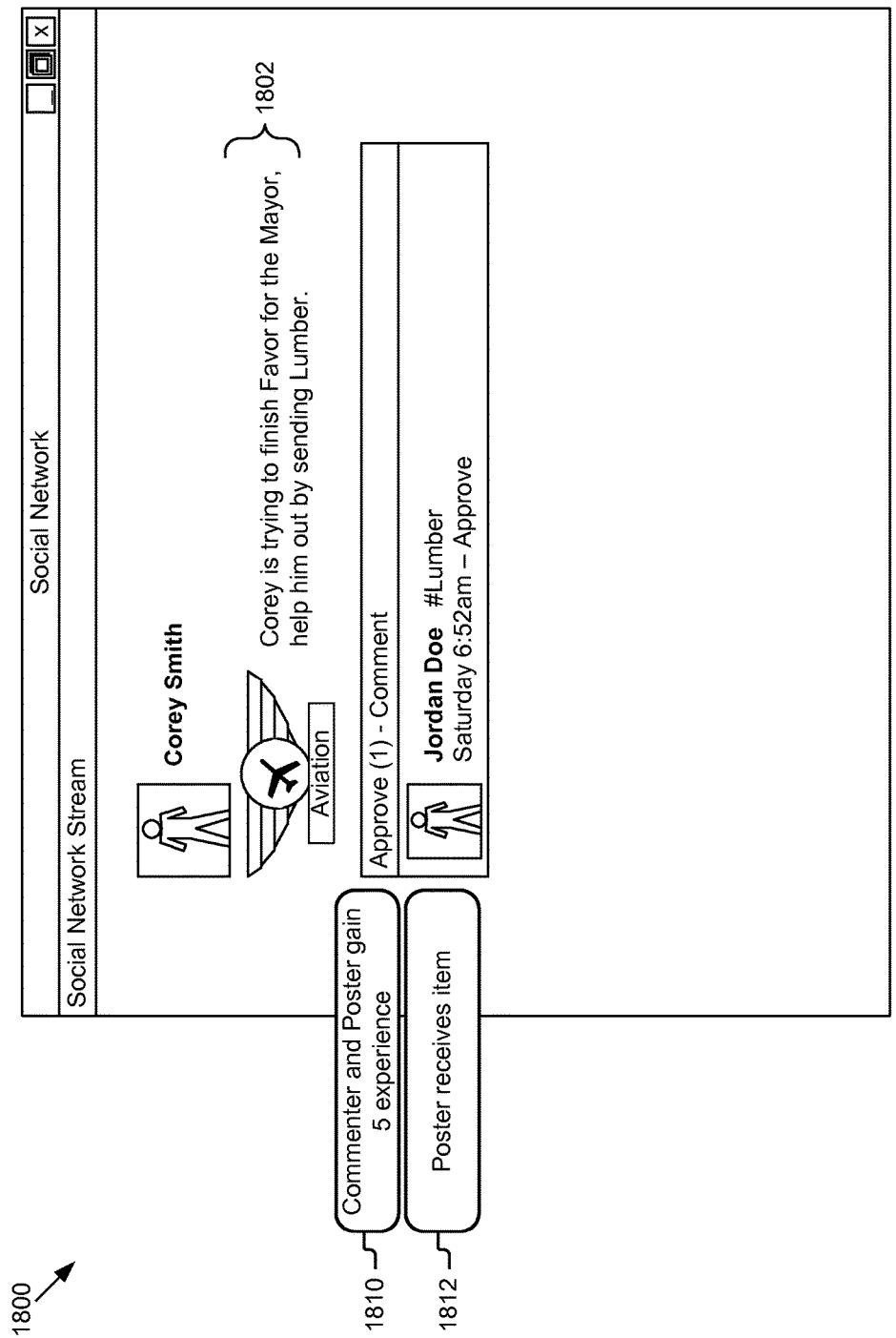
FIG. 18A is a graphical representation illustrating some embodiments of a user interface for interacting with a game via a social network including players commenting on a task within the game.

FIG. 18A illustrates an example of a user interface 1800 within a social network with a player notification about one player performing a task within the game and other player comments on the player notification. For example, the post 1802 indicates that the player is trying to finish a task, in this example, "favor for the mayor." The notification 1810 indicates that for the approval, the poster and commenter receive five experience points. The notification 1812 indicates that for the comment "#lumber" from a player, the poster receives an in-game item.

Figure 18B:
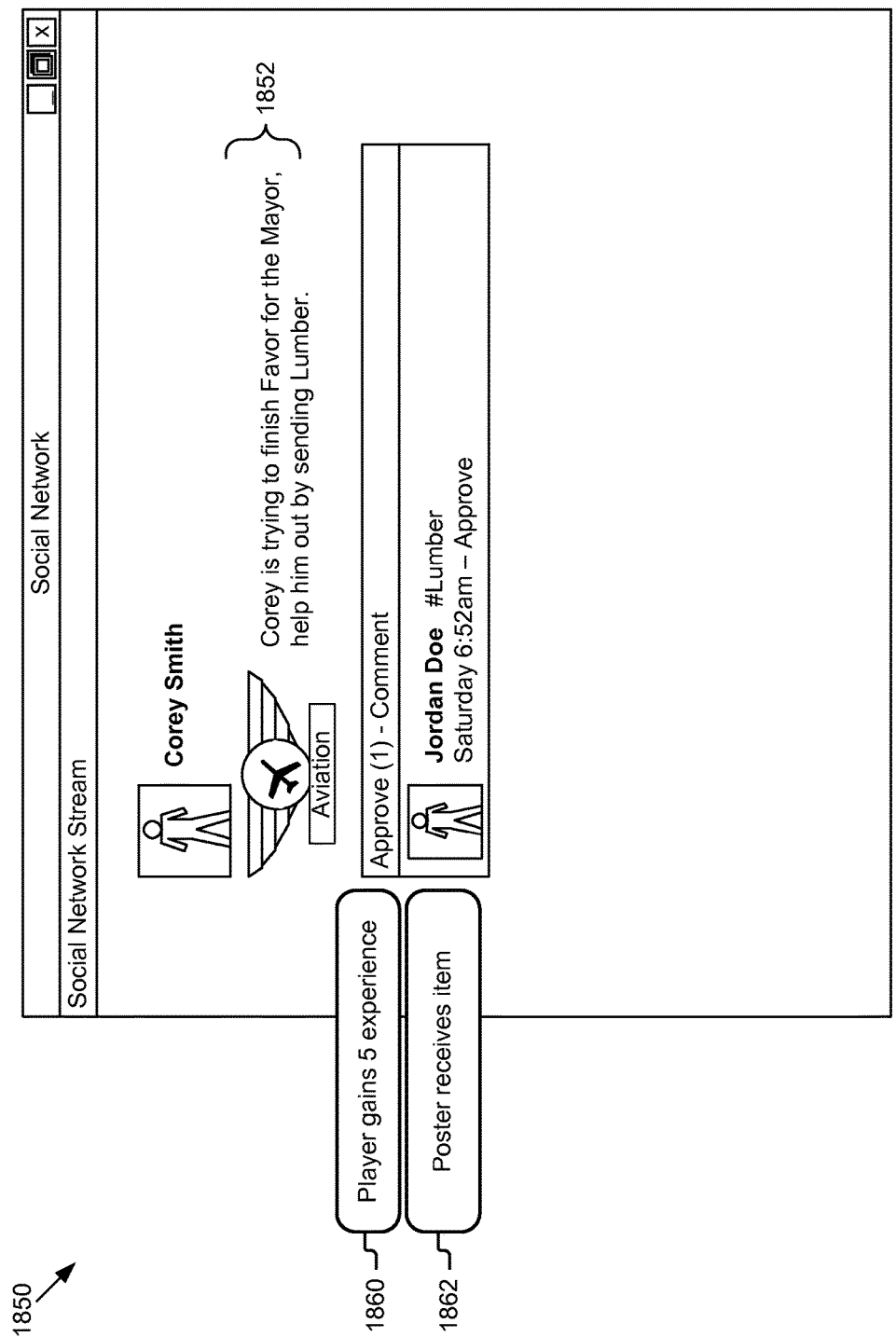
FIG. 18B is a graphical representation illustrating some embodiments of a user interface for interacting with a game via a social network including non-players commenting on a task within the game.

FIG. 18B illustrates an example of a user interface 1850 within a social network with a player notification about one player performing a task within the game and other non-player comments on the player notification. For example, the post 1852 indicates that the player is trying to finish a task, in this example, "favor for the mayor." The notification 1860 indicates that for the approval, the player (i.e., poster) receives five experience points. The notification 1862 indicates that for the comment "#lumber" from a non-player, the player (i.e., poster) receives an in-game item.

Figure 19A:
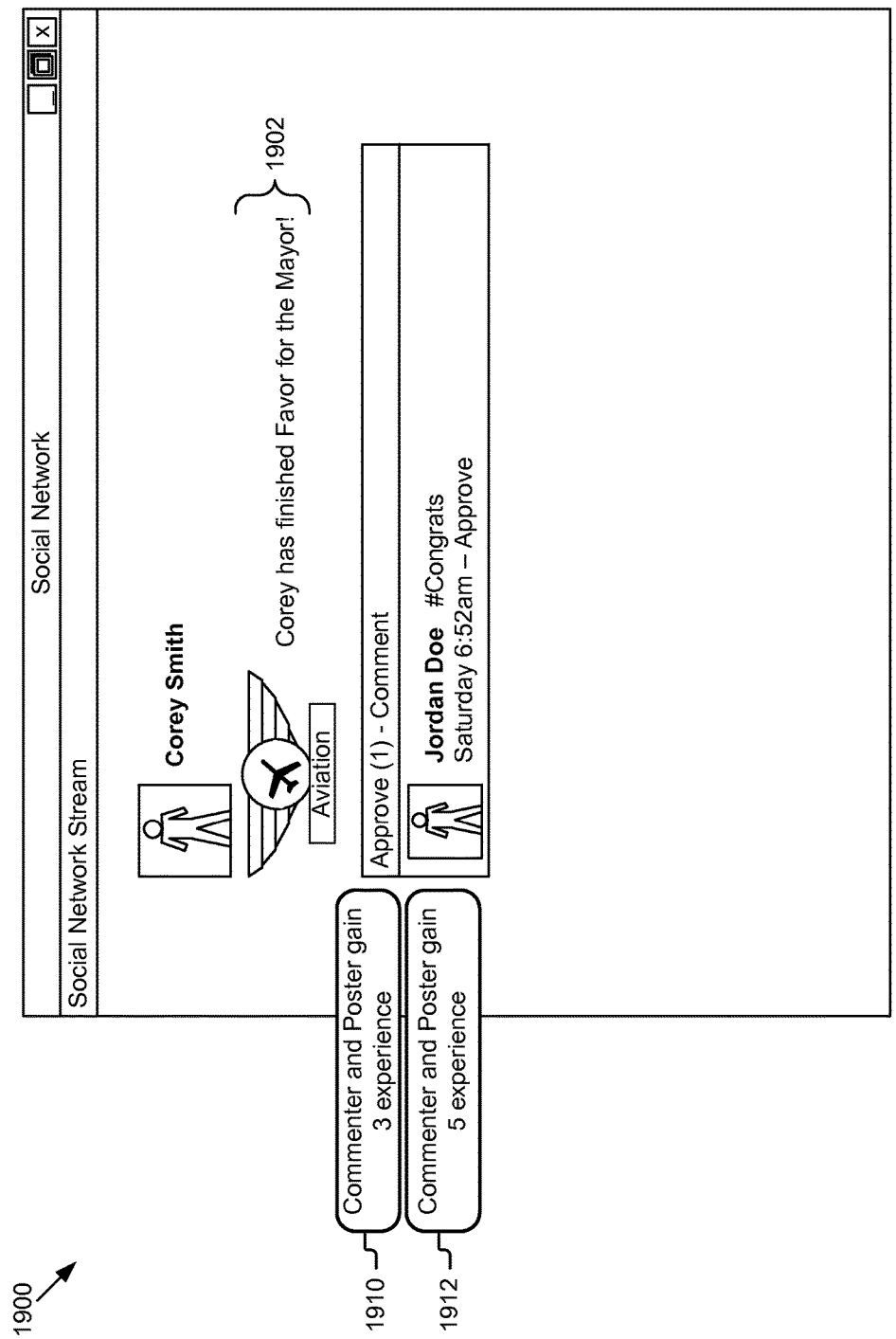
FIG. 19A is a graphical representation illustrating some embodiments of a user interface for interacting with a game via a social network including players commenting on completing a task within the game.

FIG. 19A illustrates an example of a user interface 1900 within a social network with a player notification about one player finishing a task within the game and other player comments on the player notification. For example, the post 1902 indicates that the player has finished a task, in this example, "favor for the mayor." The notification 1910 indicates that for the approval, the poster and commenter receive three experience points. The notification 1912 indicates that for the comment "#congrats" from a player, the poster and commenter receive five experience points.

Figure 19B:
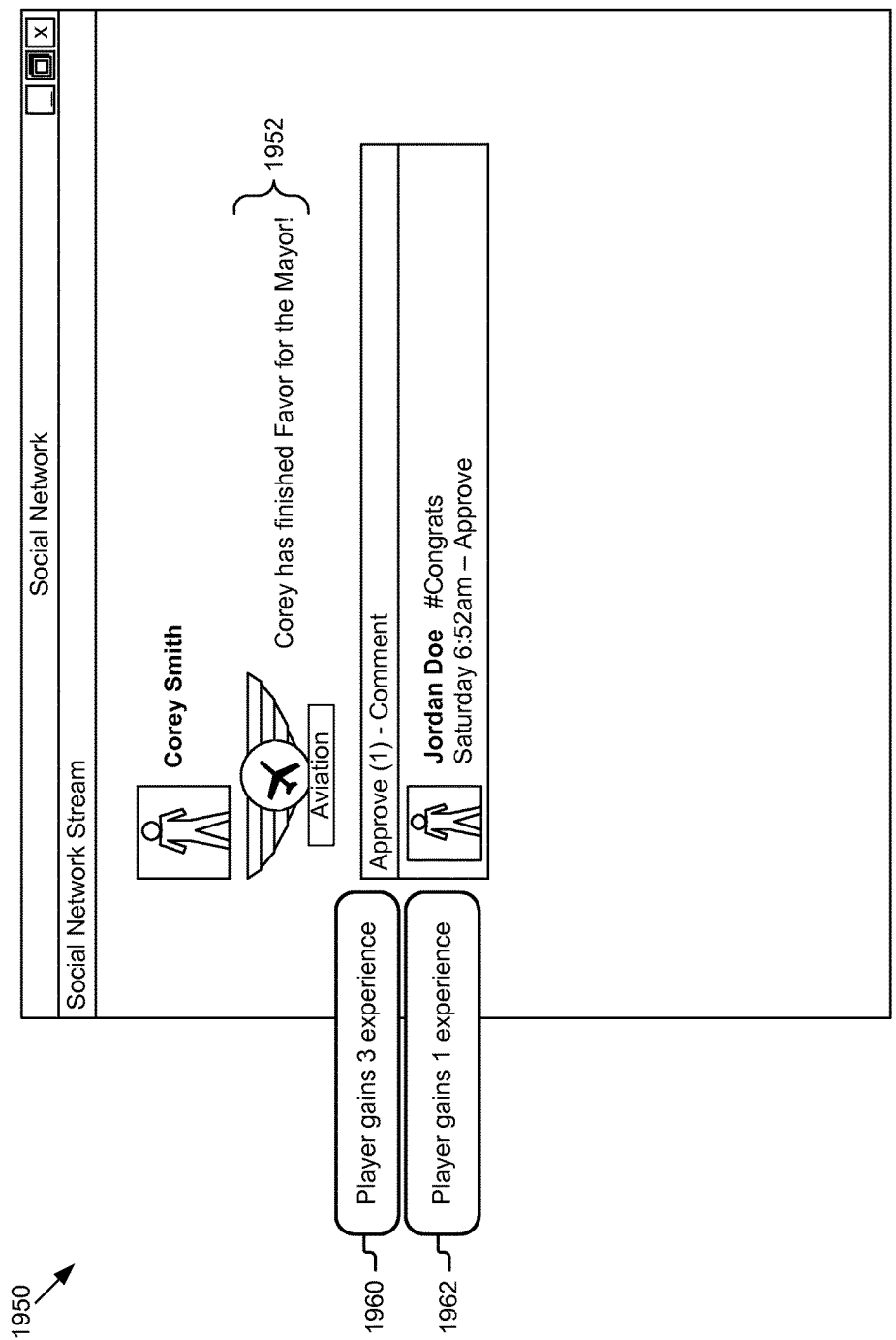
FIG. 19B is a graphical representation illustrating some embodiments of a user interface for interacting with a game via a social network including non-players commenting on completing a task within the game.

FIG. 19B illustrates an example of a user interface 1950 within a social network with a player notification about one player finishing a task within the game and other non-player comments on the player notification. For example, the post 1952 indicates that the player has finished a task, in this example, "favor for the mayor." The notification 1960 indicates that for the approval, the player (i.e., poster) receives three experience points. The notification 1962 indicates that for the comment "#congrats" from a non-player, the player (i.e., poster) receives one experience point.

Figure 20A:
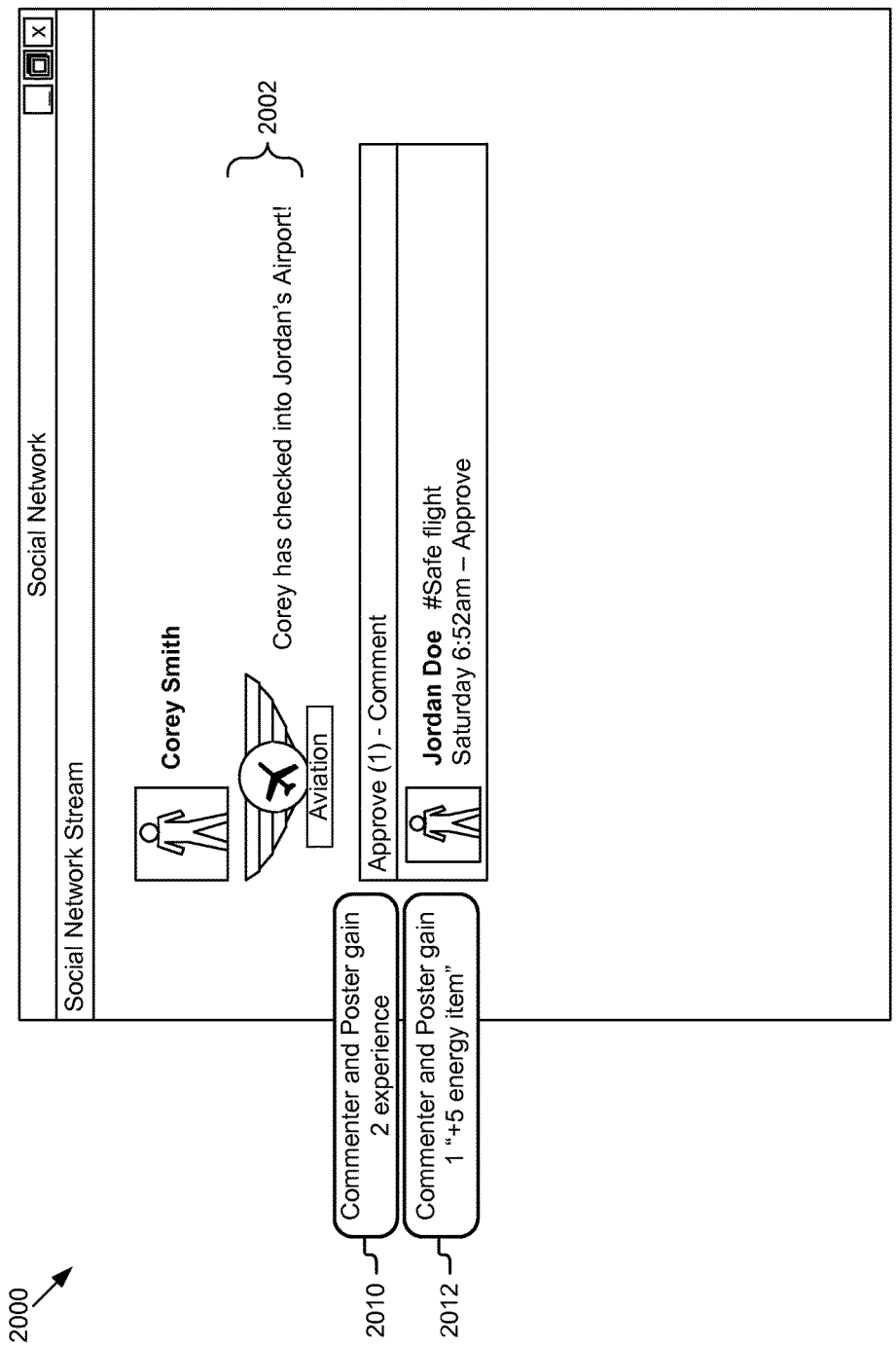
FIG. 20A is a graphical representation illustrating some embodiments of a user interface for interacting with a game via a social network including players commenting on arriving at another player's virtual area within the game.

FIG. 20A illustrates an example of a user interface 2000 within a social network with a player notification about one player arriving at another player's area within the game and other player comments on the player notification. For example, the post 2002 indicates that the player has checked into a friend's airport. The notification 2010 indicates that for the approval, the poster and commenter receive two experience points. The notification 2012 indicates that for the comment "#safe flight" from a player, the poster and commenter receive one "+5 energy item."

Figure 20B:
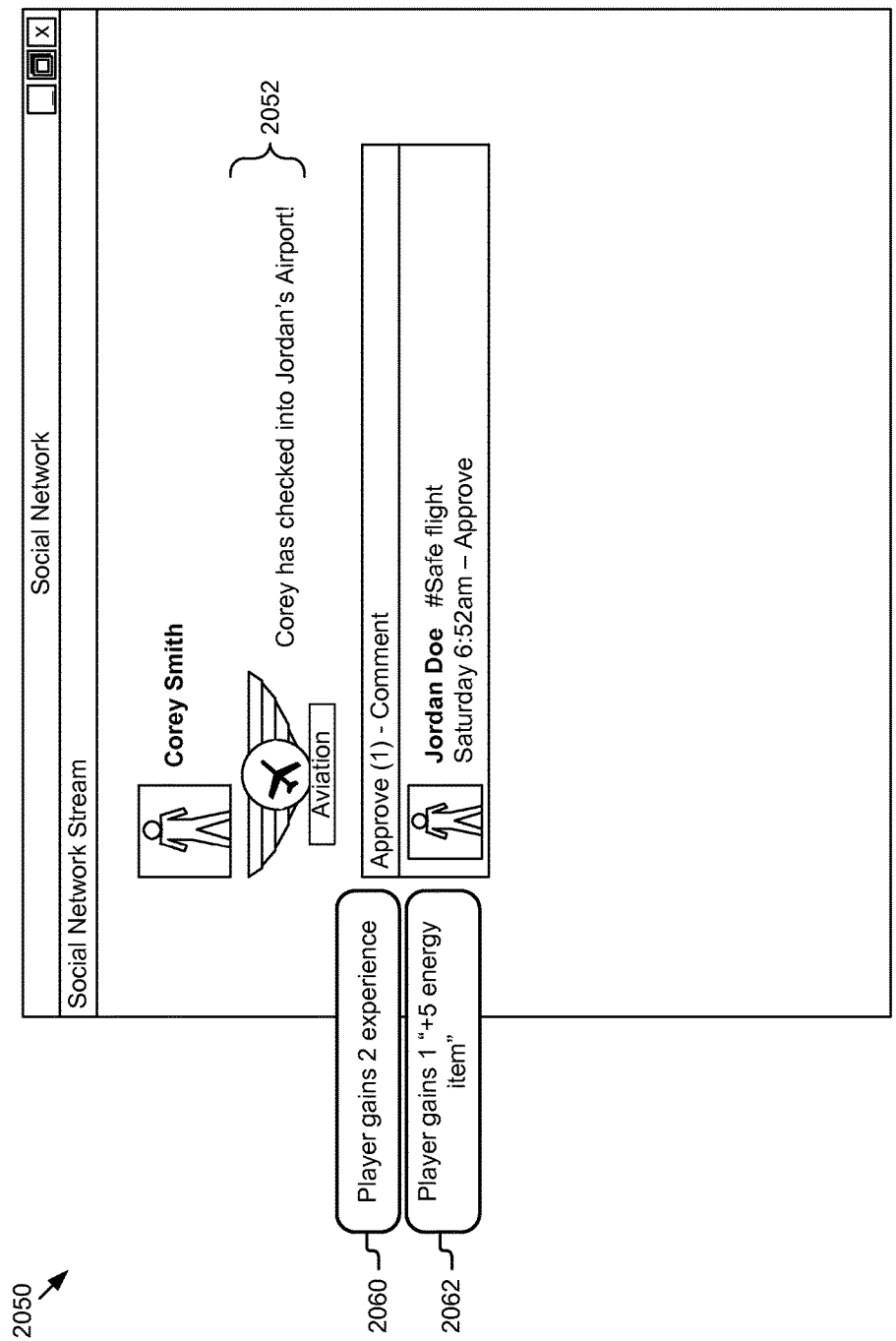
FIG. 20B is a graphical representation illustrating some embodiments of a user interface for interacting with a game via a social network including non-players commenting on arriving at another player's virtual area within the game.

FIG. 20B illustrates an example of a user interface 2050 within a social network with a player notification about one player arriving at another player's area within the game and other non-player comments on the player notification. For example, the post 2052 indicates that the player has checked into a friend's airport. The notification 2060 indicates that for the approval, the player (i.e., poster) receives two experience points. The notification 2062 indicates that for the comment "#safe flight" from a non-player, the player (i.e., poster) receives one "+5 energy item."

The comments and game actions they invoke which are described in FIGS. 9-20B are used by way of example, one skilled in the art will recognize that other examples and configurations are possible.

The foregoing description of the implementations of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood by those familiar with the art, the present technology may be implemented in other specific forms, without departing from the spirit or essential characteristics thereof. Likewise, the particular naming and division of the modules, routines, features, attributes, methodologies, and other aspects are not mandatory or significant, and the mechanisms that implement the present disclosure or its features may have different names, divisions and/or formats. Furthermore, as should be apparent to one of ordinary skill in the relevant art, the modules, routines, features, attributes, methodologies and other aspects of the present technology can be implemented as software, hardware, firmware, or any combination of the three. Also, wherever a component, an example of which is a module, of the present technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present technology is in no way limited to implementation in any specific programming language, or for any specific operating system or environment. Accordingly, the disclosure of the present technology is intended to be illustrative, but not limiting, of the scope of the present disclosure, which is set forth in the following claims.

What is claimed is:

1. A computer-implemented method operated using one or more computing devices for providing video gaming hosted on one or more servers in association with a social network, comprising:

providing access using the one or more computing devices to a video gaming environment associated with the social network, by one or more users using at least one of a plurality of different user electronic devices, the at least one of a plurality of different user electronic devices including a user interface configured to display the video gaming environment;

posting, using the one or more computing devices, a post to the social network including an event relating to the video gaming environment of interest to the social network;

generating, using the one or more computing devices, a post identification of the post;

writing, using the one or more computing devices, the post identification to a database, the database configured to store one or more post identifications;

processing, using the one or more computing devices, each of the one or more post identifications in the database for comments to determine whether the comments include one or more particular keywords commented on the post by a second user; and in response to determining that the comments include the one or more particular keywords commented on the post by the second user, using the one or more particular keywords as play relating to a select game in the video gaming environment, the video gaming environment being displayed on the user interface of the at least one of a plurality of different user electronic devices and being affected by the determination that the comments include the one or more particular keywords.

2. A computer-implemented method according to claim 1, wherein the plurality of different user electronic devices include at least one of a personal computer, a laptop, a mobile device, a gaming console, and a tablet.

3. A computer-implemented method according to claim 1, wherein the video gaming environment is hosted on a social network server.

4. A computer-implemented method according to claim 1, wherein the video gaming environment is hosted on a third party server linked to the social network.

5. A computer-implemented method according to claim 1, wherein the video gaming environment is hosted in a cloud linked to the social network, wherein the video gaming environment provides a plurality of different games.

6. A computer-implemented method according to claim 1, wherein the video gaming environment is hosted by a cross-platform server accommodating access by all of the different user electronic devices.

7. A computer-implemented method according to claim 1, wherein at least one of the one or more users performs a play in the video gaming environment via a comment posted in the social network.

8. A computer-implemented method according to claim 1, wherein the select game includes at least one of a main game for play via the social network and a sub-game for play via the social network.

9. A computer-implemented method according to claim 1, further comprising:

designating a particular status level to the one or more users, wherein the particular status designated controls a play capability accorded to the one or more users depending upon the particular status level.

10. A system architecture for providing video gaming hosted on one or more servers in association with a social network, comprising one or more computing devices configured to operate based on instructions that cause the one or more computing devices to:

provide access using the one or more computing devices to a video gaming environment associated with the social network, by one or more users using at least one of a plurality of different user electronic devices, the at one of the plurality of different user electronic devices including a user interface configured to display the video gaming environment;

post, using the one or more computing devices, a post to the social network including an event relating to the video gaming environment of interest to the social network;

generate, using the one or more computing devices, a post identification of the post;

writing, using the one or more computing devices, the post identification to a database, the database configured to store one or more post identifications;

process, using the one or more computing devices, each of the one or more post identifications in the database for comments to determine whether the comments include one or more particular keywords commented on the post by a second user; and in response to determining that the comments include the one or more particular keywords commented on the post by the second user, use the one or more particular keywords as play relating to a select game in the video gaming environment, the video gaming environment being displayed on the user interface of the at least one of the plurality of different user electronic devices and being affected by the determination that the comments include the one or more particular keywords.

11. A system architecture according to claim 10, wherein the plurality of different user electronic devices include at least one of a personal computer, a laptop, a mobile device, a gaming console, and a tablet.

12. A system architecture according to claim 10, wherein the video gaming environment is hosted on a social network server.

13. A system architecture according to claim 10, wherein the video gaming environment is hosted on a third party server associated with a social network.

14. A system architecture according to claim 10, wherein the video gaming environment is hosted in a cloud linked to the social network, wherein the video gaming environment provides a plurality of different games.

15. A system architecture according to claim 10, wherein the video gaming environment is hosted by a cross-platform server accommodating access by all of the different user electronic devices.

16. A system architecture according to claim 10, wherein at least one of the one or more users performs a play in the video gaming environment via a comment posted in the social network.

17. A system architecture according to claim 10, wherein the select game includes at least one of a main game for play via the social network and a sub-game for play via the social network.

18. A system architecture according to claim 10, further comprising:
    designating a particular status level to the one or more users, wherein the particular status designated controls a play capability accorded to the one or more users depending upon the particular status level.

* * * * *